US009546230B2

(12) United States Patent
Sita

(10) Patent No.: US 9,546,230 B2
(45) Date of Patent: Jan. 17, 2017

(54) METHODS FOR STEREOSELECTIVE COORDINATIVE CHAIN TRANSFER POLYMERIZATION OF OLEFINS

(71) Applicant: University of Maryland, College Park, Silver Spring, MD (US)

(72) Inventor: Lawrence R. Sita, Silver Spring, MD (US)

(73) Assignee: University of Maryland, College Park, College Park, MD (US)

( * ) Notice: Subject to any disclaimer, the term of this patent is extended or adjusted under 35 U.S.C. 154(b) by 0 days.

(21) Appl. No.: 14/153,817

(22) Filed: Jan. 13, 2014

(65) Prior Publication Data

US 2014/0221586 A1    Aug. 7, 2014

Related U.S. Application Data

(60) Provisional application No. 61/751,560, filed on Jan. 11, 2013.

(51) Int. Cl.
*C08F 4/6592* (2006.01)
*C08F 4/643* (2006.01)
*C08F 10/00* (2006.01)
*C08F 110/06* (2006.01)
*C08F 4/659* (2006.01)
*C08F 4/64* (2006.01)

(52) U.S. Cl.
CPC .......... *C08F 110/06* (2013.01); *C08F 4/64044* (2013.01); *C08F 4/6592* (2013.01); *C08F 4/65908* (2013.01); *C08F 10/00* (2013.01)

(58) Field of Classification Search
CPC ..... C08F 4/65908; C08F 4/6592; C08F 10/00; C08F 110/06
See application file for complete search history.

(56) References Cited

U.S. PATENT DOCUMENTS 8,188,200 B2 *   5/2012   Sita et al. ............... 526/161
8,513,366 B2 *   8/2013   Sita et al. ............... 526/86

OTHER PUBLICATIONS

Zhang et al.. "Investigation fo Dynamic Intra- and Intermolecular Processes with a Tether-Length Dependent Series of Group 4 Bimetallic Initiators for Stereomodulated Degenerative Transfer Living Ziegler-Natta Propene Polymerization", Adv. Synth. Catal. 2008, 350, 439-447.*
Alfano, F., et al., "Polypropylene 'Chain Shuttling' at Enantiomorphous and Enantiopure Catalytic Species: Direct and Quantitative Evidence from Polymer Microstructure," *Macromolecules* 40:7736-7738, American Chemical Society, United States (2007).
Arriola, D. J., et al., "Catalytic Production of Olefin Block Copolymers via Chain Shuttling Polymerization," *Science* 312:714-719, American Association for the Advancement of Science, United States (2006).
Bazan, G.C., et al., "Catalytic Insertion of Ethylene into Al—C Bonds with Pentamethylcyclopentadienyl—Chromium (III) Complexes," *Organometallics* 20:2059-2064, American Chemical Society, United States (2001).
Bochmann, M., "Cationic Group 4 metallocene complexes and their role in polymerisation catalysis: the chemistry of well defined Ziegler catalysts," *J. Chem. Soc., Dalton Trans.* 3:255-270, Royal Society of Chemistry, United States (1996).
Britovsek, G.J.P., et al., "Iron-Catalyzed Polyethylene Chain Growth on Zinc: Linear α-Olefins with a Poisson Distribution," *Angew. Chem. Int. Ed.* 41(3):489-491, Wiley-VCH, Germany (2002).
Britovsek, G.J.P., et al., "Iron Catalyzed Polyethylene Chain Growth on Zinc: A Study of the Factors Delineating Chain Transfer versus Catalyzed Chain Growth in Zinc and Related Metal Alkyl Systems," *J. Am. Chem. Soc.* 126:10701-10712, American Chemical Society, United States (2004).
Busico, V., et al., "Full Assignment of the $^{13}$C NMR Spectra of Regioregular Polypropylenes: Methyl and Methylene Region," *Macromolecules* 30:6251-6263, American Chemical Society, United States (1997).
Busico, V., and Cipullo, R., "Microstructure of polypropylene," *Prog. Polym. Sci.* 26:443-533, Elsevier Science Ltd., Netherlands (2001).
Chenal, T., et al., "Controlled polyethylene chain growth on magnesium catalyzed by lanthanidocene: A living transfer polymerization for the synthesis of higher dialkyl-magnesium," *Polymer* 48:1844-1856, Elsevier Ltd., Netherlands (2007).

(Continued)

*Primary Examiner* — Caixia Lu
(74) *Attorney, Agent, or Firm* — Sterne, Kessler, Goldstein & Fox P.L.L.C.

(57) ABSTRACT

The present invention provides a method of producing a polyolefin composition comprising contacting a binuclear metallocene pre-catalyst and a co-catalyst, adding a excess of a metal alkyl, then adding a first olefin monomer. The method allows for the production of polyolefins with a highly stereoregular stereochemical microstructure through living coordination polymerization in which rapid reversible chain transfer between a racemic mixture of a chiral active transition metal propagating center and multiple equivalents of inert main group metal alkyl is competitive with chain-growth propagation at the active center. By virtue of the slower rate of chain-transfer relative to propagation that can be achieved with a binuclear catalyst relative to the corresponding mononuclear catalyst, the present invention provides a work-around solution to the intrinsic limitation on product volume imposed by a traditional living polymerization, as well as a work-around solution to the stereochemically random microstructure that is normally obtained as the result of rapid and reversible chain-transfer between two populations of chiral active propagating centers, of opposite absolute configuration, when a racemic mixture of the pre-catalyst is employed. In essence, the field of invention is defined as stereoselective living coordinative chain-transfer polymerization.

20 Claims, 6 Drawing Sheets

(56) References Cited

OTHER PUBLICATIONS

Coates, G.W., et al., "Catalysts for the Living Insertion Polymerization of Alkenes: Access to New Polyolefin Architectures Using Ziegler—Natta Chemistry," *Angew. Chem. Int. Ed.* 41:2236-2257, Wiley-VCH, Germany (2002).

Domski, G.J., et al., "Living alkene polymerization: New methods for the precision synthesis of polyolefins," *Prog. Polym. Sci.* 32:30-92, Elsevier, Netherlands (2007).

Ganesan, M., and Gabbaï, F.P., "[Cp*Cr($C_6F_5$)(Me)(Py)] as a Living Chromium(III) Catalyst for the 'Aufbaureaktion,'" *Organometallics* 23:4608-4613, American Chemical Society, United States (2004).

Ganesan, M., and Gabbaï, F.P., "Synthesis, structure and catalytic properties of [Cp*Cr($C_6F_5$)(Bn)(THF)] toward ethylene in the presence of AlEt$_3$," *Journal of Organometallic Chemistry* 690:5145-5149, Elsevier B.V., Netherlands (2005).

Harney, M.B., et al., "Discrete, Multiblock Isotactic-Atactic Stereoblock Polypropene Microstructures of Differing Block Architectures through Programmable Stereomodulated Living Ziegler—Natta Polymerization," *Angew. Chem. Int. Ed.* 45:2400-2404, Wiley-VCH, Germany (2006).

Harney, M.B., et al., "Bimolecular Control over Polypropene Stereo-chemical Microstructure in a Well-Defined Two-State System and a New Fundamental Form: Stereogradient Polypropene," *Angew. Chem. Int. Ed.* 45:6140-6144, Wiley-VCH, Germany (2006).

Hustad, P.D., et al., "Continuous Production of Ethylene-Based Diblock Copolymers Using Coordinative Chain Transfer Polymerization," *Macromolecules* 40(20):7061-7064, American Chemical Society, United States (2007).

Hustad, P.D. et al., "An Exploration of the Effects of Reversibility in Chain Transfer to Metal in Olefin Polymerization," *Macromolecules* 41(12):4081-4089, American Chemical Society, United States (2008).

Jayaratne, K.C., and Sita, L.R., "Stereospecific Living Ziegler—Natta Polymerization of 1-Hexene," *J. Am. Chem. Soc.* 122:958-959, American Chemical Society, United States (2000).

Jayaratne, K.C., et al., "Living Ziegler—Natta Cyclopolymerization of Nonconjugated Dienes: New Classes of Microphase-Separated Polyolefin Block Copolymers via a Tandem Polymerization/Cyclopolymerization Strategy," *J. Am. Chem. Soc.* 122:10490-10491, American Chemical Society, United States (2000).

Kaminsky, W., and Arndt, M., "Metallocenes for Polymer Catalysis," *Adv. Polym. Sci.* 127:144-187, Springer-Verlag, Germany (1997).

Kaneyoshi, H., et al., "Synthesis of Block and Graft Copolymers with Linear Polyethylene Segments by Combination of Degenerative Transfer Coordination Polymerization and Atom Transfer Radical Polymerization," *Macromolecules* 38(13):5425-5435, American Chemical Society, United States (2005).

Keaton, R.J., et al., "Dramatic Enhancement of Activities for Living Ziegler—Natta Polymerizations Mediated by 'Exposed' Zirconium Acetamidinate Initiators: The Isospecific Living Polymerization of Vinylcyclohexane," *J. Am. Chem. Soc.* 123:6197-6198, American Chemical Society, United States (2001).

Kempe, R., "How to Polymerize Ethylene in a Highly Controlled Fashion?" *Chem. Eur. J.* 13:2764-2773, Wiley-VCH, Germany (2007).

Kissounko, D.A., et al., Structure/activity relationships for the living Ziegler—Natta polymerization of 1-hexene by the series of cationic monocyclopentadienyl zirconium acetamidinate complexes[($\eta^5$—$C_5Me_5$)ZrMe{N(CH$_2$R)C(Me)N(t-Bu)}][B($C_6F_5$)$_4$] (R=Me, i-Pr, t-Bu, Ph, 2-Cl$C_6H_4$, 3-Me$C_6H_4$, and 2,4,6-Me$_3C_6H_2$), *Inorganica Chimica. Acta* 345:121-129, Elsevier Science B.V., Netherlands (2003).

Koterwas, L.A., et al., "Stereospecific Syntheses, Metal Configurational Stabilities, and Conformational Analyses of meso-(R,S)- and (R,R)-($\eta$5—$C_5R_5$)Ti(CH$_3$)$_2$—N,N-bis(1-phenylethyl)acetamidinates for R=H and Me," *Organometallics* 18:4183-4190, American Chemical Society, United States (1999).

Kretschmer, W.P., et al., "Reversible Chain Transfer between Organoyttrium Cations and Aluminum: Synthesis of Aluminum-Terminated Polyethylene with Extremely Narrow Molecular-Weight Distribution," *Chem. Eur. J.* 12:8969-8978, Wiley-VCH, Germany (2006).

Li, L., et al., "Catalyst/Cocatalyst Nuclearity Effects in Single-Site Polymerization. Enhanced Polyethylene Branching and $\alpha$-Olefin Comonomer Enchainment in Polymerizations Mediated by Binuclear Catalysts and Cocatalysts via a New Enchainment Pathway," *J. Am. Chem. Soc.* 124:12725-12741, American Chemical Society, United States (2002).

Lin, S., et al., "2-Arylindene Metallocenes: Conformationally Dynamic Catalysts to Control the Structure and Properties of Polyproplyenes," *Acc. Chem. Res.* 35:765-773, American Chemical Society, United States (2002).

Mani, G., and Gabbaï, F.P., "A Neutral Chromium(III) Catalyst for the Living 'Aufbaureaktion,'" *Angew. Chem. Int. Ed.* 43(17):2263-2266, Wiley-VCH, Germany (2004).

Marks, T.J., "Surface-Bound Metal Hydrocarbyls. Organometallic Connections between Heterogeneous and Homogeneous Catalysis," *Acc. Chem. Res.* 25(2):57-65, American Chemical Society, United States (1992).

Matyjaszewski, K., "Introduction to Living Polymerization. Living and/or Controlled Polymerization," *Journal of Physical Organic Chemistry* 8:197-207, John Wiley & Sons, Ltd., United States (1995).

Möhring, P.C., and Coville, N.J., "Homogeneous Group 4 metallocene Ziegler—Natta catalysts: the influence of cyclopentadienyl-ring substituents," *Journal of Organometallic Chemistry* 479:1-29, Elsevier Science S.A., Netherlands (1994).

Müller, A.H.E., et al., "Kinetic Analysis of 'Living' Polymerization Processes Exhibiting Slow Equilibria. 1. Degenerative Transfer (Direct Activity Exchange between Active and 'Dormant' Species). Application to Group Transfer Polymerization," *Macromolecules* 28:4326-4333, American Chemical Society, United States (1995).

Pelletier, J.-F., et al., "Synthesis of New Dialkylmagnesium Compounds by Living Transfer Ethylene Oligo- and Polymerization with Lanthanocene Catalysts," *Agnew. Chem. Int. Ed. Engl.* 35(16):1854-1856, VCH Verlagsgesellschaft mbH, Germany (1996).

Quirk, R.P., and Lee, B., "Experimental Criteria for Living Polymerizations," *Polymer International* 27:359-367, Society of Chemical Industry, United Kingdom (1992).

Reybuck, S.E., et al., "Copolymerization Behavior of Unbridged Indenyl Metallocenes: Substituent Effects on the Degree of Comonomer Incorporation," *Macromolecules* 35:637-643, American Chemical Society, United States (2002).

Ring, J.O., et al., "Controlled Synthesis and Characterization of Poly[ethylene-*block*-(L,L-lactide)]s by Combining Catalytic Ethylene Oligomerization with 'Coordination-Insertion' Ring-Opening Polymerization," *Macromol. Chem. Phys.* 208:896-902, Wiley-VCH, Germany (2007).

Rogers, J.S., and Bazan, G.C., "Oligomerization-transmetalation reactions of Cp*CrMe$_2$(PMe$_3$)/methylaluminoxane catalysts," *Chem. Commun.* 1209-1210, The Royal Society of Chemistry, United Kingdom (2000).

Sakuma, A., et al., "Living Olefin Polymerization and Block Copolymer Formation with FI Catalysts," *Polymer Journal* 39:193-207, The Society of Polymer Science, Japan (2007).

Sita, L.R., and Babcock, J.R., "Rapid Access to Dimethylcyclopentadienyltitanium(IV) Amidinate, ($C_5R_5$)TiMe$_2$[NR$^1$C(R$^2$)NR$^3$] (R=H and Me; R$^2$=Me), Libraries," *Organometallics* 17:5228-5230, American Chemical Society, United States (1998).

Sita, L.R., "Ex Uno Plures ('Out of One, Many'): New Paradigms for Expanding the Range of Polyolefins through Reversible Group Transfers," *Angew. Chem. Int. Ed.* 48:2464-2472, Wiley-VCH, Germany (2009).

Van Meurs, M., et al., "Polyethylene Chain Growth on Zinc Catalyzed by Olefin Polymerization Catalysts: A Comparative Investigation of Highly Active Catalyst Systems across the Transition Series," *J. Am. Chem. Soc.* 127:9913-9923, American Chemical Society, United States (2005).

(56) References Cited

OTHER PUBLICATIONS

Ventolà, L., et al., "Molecular alloys as phase change materials (MAPCM) for energy storage and thermal protection at temperatures from 70 to 85° C.," *J. Phys. Chem. Solids* 66:1668-1674, Elsevier, Netherlands (2005).

Wei, J., et al., "Aufbaureaktion Redux: Scalable Production of Precision Hydrocarbons from $AlR_3$ (R=Et or iBu) by Dialkyl Zinc Mediated Ternary Living Coordinative Chain-Transfer Polymerization," *Angew. Chem. Int. Ed.* 49:1768-1772, Wiley-VCH, Germany (2010).

Wei, J., et al., "Programmable Modulation of Co-monomer Relative Reactivities for Living Coordination Polymerization through Reversible Chain Transfer between 'Tight' and 'Loose' Ion Pairs," *Angew. Chem. Int. Ed.* 49:9140-9144, Wiley-VCH, Germany (2010).

Zhang, W., and Sita, L.R., "Investigation of Dynamic Intra- and Intermolecular Processes within a Tether-Length Dependent Series of Group 4 Bimetallic Initiators for Stereomodulated Degenerative Transfer Living Ziegler—Natta Propene Polymerization," *Adv. Synth. Catal.* 350:439-447, Wiley-VCH, Germany (2008).

Zhang, W., and Sita, L.R., "Highly Efficient, Living Coordinative Chain-Transfer Polymerization of Propene with $ZnEt_2$: Practical Production of Ultrahigh to Very Low Molecular Weight Amorphous Atactic Polypropenes of Extremely Narrow Polydispersity," *J. Am. Chem. Soc.* 130:442-443, American Chemical Society, United States (2008).

Zhang, W., et al., "Living Coordinative Chain-Transfer Polymerization and Copolymerization of Ethene, $\alpha$-Olefins, and $\alpha,\omega$-Nonconjugated Dienes using Dialkylzinc as 'Surrogate' Chain-Growth Sites," *Macromolecules* 41:7829-7833, American Chemical Society, United States (2008).

Zhang, Y., and Sita, L.R., "Solid-supported stereospecific living Ziegler—Natta polymerization of $\alpha$-olefins," *Chem. Commun.* 2358-2359, The Royal Society of Chemistry, United Kingdom (2003).

Zhang, Y., et al., "Degenerative Transfer Living Ziegler-Natta Polymerization: Application to the Synthesis of Monomodal Stereoblock Polyolefins of Narrow Polydispersity and Tunable Block Length," *J. Am. Chem. Soc.* 125(30):9062-9069, American Chemical Society, United States (2003).

Zhang, Y., and Sita, L.R., "Stereospecific Living Ziegler-Natta Polymerization via Rapid and Reversible Chloride Degenerative Transfer between Active and Dormant Sites," *J. Am. Chem. Soc.* 126(25):7776-7777, American Chemical Society, United States (2004).

Zhang, Y., et al., "Goldilocks Effect of a Distal Substituent on Living Ziegler—Natta Polymerization Activity and Stereoselectivity within a Class of Zirconium Amidinate-Based Initiators," *Organometallics* 23:3512-3520, American Chemical Society, United States (2004).

* cited by examiner

METHODS FOR STEREOSELECTIVE COORDINATIVE CHAIN TRANSFER POLYMERIZATION OF OLEFINS

Part of the work performed during development of this invention utilized U.S. Government funds. This invention was made with government support under CHE1152294 awarded by the National Science Foundation. The U.S. Government has certain rights in this invention.

BACKGROUND OF THE INVENTION

Field of the Invention

The present invention provides a method of producing a polyolefin composition comprising contacting a binuclear metallocene pre-catalyst and a co-catalyst, adding a excess of a metal alkyl, then adding a first olefin monomer. The method allows for the production of polyolefins with a highly stereoregular stereochemical microstructure through living coordination polymerization in which rapid reversible chain transfer between a racemic mixture of a chiral active transition metal propagating center and multiple equivalents of inert main group metal alkyl is competitive with chain-growth propagation at the active center. By virtue of the slower rate of chain-transfer relative to propagation that can be achieved with a binuclear catalyst relative to the corresponding mononuclear catalyst, the present invention provides a work-around solution to the intrinsic limitation on product volume imposed by a traditional living polymerization, as well as a work-around solution to the stereochemically random microstructure that is normally obtained as the result of rapid and reversible chain-transfer between two populations of chiral active propagating centers, of opposite absolute configuration, when a racemic mixture of the pre-catalyst is employed. In essence, the field of invention is defined as stereoselective living coordinative chain-transfer polymerization.

Related Art

Several transition-metal-based catalysts have been reported that can mediate the living metal-mediated coordination polymerization (also known as homogeneous, single-site Ziegler-Natta polymerization) of ethene, propene, higher α-olefins, and α,ω-nonconjugated dienes, and, in some cases, these proceed with a high degree of stereocontrol (tacticity) ((for a review of catalysts for living coordination polymerization of ethene and α-olefins, see: Coates, G. W., et al., *Angew. Chem. Int. Ed.* 41:2236-2257 (2002)); (for the living and stereoselective coordination polymerization of α-olefins and α,ω-non-conjugated dienes, see: Jayaratne, K. C., et al., *J. Am. Chem. Soc.* 122:958-959 (2000); Jayaratne, K. C., et al., *J. Am. Chem. Soc.* 122: 10490-10491 (2000); Keaton, R. J., et al., *J. Am. Chem. Soc.* 123:6197-6198 (2001); Zhang, Y., et al., *Chem. Commun.* 2358-2359 (2003); Zhang, Y., et al., *Organometallics* 23:3512-3520 (2004); Harney, M. B., et al., *Angew. Chem. Int. Ed.* 45:2400-2404 (2006); Harney, M. R, et. al., *Angew. Chem. Int. Ed.* 45:6140-6144 (2006); Zhang, W., et al., *Adv. Synth. Catal.* 350:439-447 (2008))). However, the commercialization of new polyolefin materials and products that take advantage of the unique capabilities of living coordination polymerizations appears unlikely (for reviews of polyolefin materials prepared through living coordination polymerization, see: Domski, G. J., et al., *Prog. Polym. Sci.* 32:30-92 (2007); Sakuma, A., et al., *Polym. J.* 1 39:193-207 (2007); Szwarc, M., et al., *Ionic Polymerization and Living Polymers*; Chapman & Hall: New York (1993); Quirk, R. P., et al., *Polym. Int.* 27:359-367 (1992); Matyjaszewski, K., *J. Phys. Org. Chem.* 8:197-207 (1995)).

The same fundamental criterion of a living polymerization, namely, chain-growth propagation in the absence of irreversible chain termination, serves to establish a "one polymer chain per active metal center" cap on product yield as a critical liability. The severity of this liability sharply increases as the targeted number-average degree of polymerization, $X_n$, of the desired polyolefin product decreases. While living coordination polymerization is ideally suited for accessing the largely unexplored material science and technology associated with architecturally well-structured 'precision polyolefins' of very low to moderate molecular weights (ca 500-10,000 Da), the practical availability of significant quantities of these materials presently remains out of reach due to unfavorable weight (polymer) to weight (catalyst) ratios ((for a review of catalysts for living coordination polymerization of ethene and α-olefins. See Coates, G. W., et al., *Angew. Chem. Int. Ed.* 41:2236-2257 (2002)); (for reviews of polyolefin materials prepared through living coordination polymerization, see Domski, J., et al., *Prog. Polym. Sci.* 32:30-92 (2007); Sakuma, A., et al., *Polym. J.* 39:193-207 (2007); Szwarc, M., et al., *Ionic Polymerization and Living Polymers*; Chapman & Hall: New York (1993); Quirk, R. P., et al., *Polym. Int.* 27:359-367 (1992); Matyjaszewski, K., *J. Phys. Org. Chem.* 8:197-207 (1995); Kaneyoshi, H., et al., *Macromolecules* 38:5425-5435 (2005); Ring, J. O., et al., *Macromol. Chem. Phys.* 208:896-902 (2007); Ventolá, L., et al., *J. Phys. Chem. Solids* 66:1668-1674 (2005))).

U.S. Pat. No. 8,188,200 discloses the living coordinative chain-transfer polymerization and copolymerization of ethene, propene, long-chain α-olefins, and α,ω-nonconjugated dienes using $\{\eta^5\text{-}C_5Me_5)Hf(Me)[N(Et)C(Me)N(Et)]\}$ $[B(C_6F_5)_4]$ as the active transition-metal initiator for chain-growth propagation with multiple stoichiometric equivalents of diethylzinc ($ZnEt_2$) as surrogate chain growth sites. Successful living coordinative chain-transfer polymerization of these monomers requires that the rate, and rate constant for reversible (polymeryl group) chain transfer between the active transition-metal propagating centers, and the inactive surrogate main-group metal species, $v_{ct}$ and $k_{ct}$, respectively, should be far greater than the corresponding kinetic parameters for transition-metal-mediated propagation, $v_p$ and $k_p$, in order to insure that all active and surrogate species appear to propagate at the same rate.

To address the problems inherent with the 'one catalyst-one material' strategy, several strategies have been introduced to achieve 'catalyst-many materials' by using dynamic processes competitive to chain propagation. For example, Waymouth and Coates took advantage of conformational flexibility in unconstrained 'oscillating' metallocenes to prepare atactic-isotactic stereoblock polypropenes such as elastomers and softened theromoplastics. See Coates, G. W., et al., *Science* 267:217-219 (1995) and Lin, S., et al., *Acc. Chem. Res.* 35:765-773 (2002). However, no method has been developed to directly modulate chain propagation rates in a single catalyst system.

It is well-known that co-catalyst and the resulting anion play an important role in homogeneous Zeigler-Natta polymerization by stabilizing the cationic transition metal center which is the initiator of olefin polymerization. See Kaminsky, W., et al., *Adv. Polym. Sci.* 127:144-187 (1997); Bohmann, M., *J. Chem. Soc., Dalton Trans.*:255-270 (1996); Brintzinger, H.-H., et al., *Angew. Chem. Int. Ed.* 34:1143-1170 (1995); Guram, A. S., et al., *Comprehensive Organometallic Chemistry II*, Chapter 2; Elsevier: Oxford (1995); Soga, K., et al., *Catalyst Design for Tailor-Made Polyolefins*; Elsevier: Tokyo (1994); Möhring, P. C., et al., *J. Organomet. Chem.* 479:1-29 (1994); Marks, T. J., *Acc. Chem. Res.* 25:57-65 (1992). Marks and co-workers reported that for olefin copolymerization, tris(2,2',2"-nonafluorobiphenyl) borane (PBB) and tetrakis borate anion $B(C_6H_5)_4^-$ derived cationic complexes exhibited higher catalytic activity and comonomer incorporation level than the $MeB(C_6H_5)_4^-$ analogues. See Chen, Y.-X., et al., *J. Am. Chem. Soc.* 120:6287-6305 (1998); Chen, M. C., et al., *J. Am. Chem. Soc.* 123:11803-11804 (2001); Li, L., et al., *J. Am. Chem. Soc.* 124:12725-12741 (2002). $MeB(C_6H_5)_4^-$ is a more coordinating anion than bulkier $MePBB^-$ and $B(C_6H_5)_4^-$, and the relatively stronger cation-anion ion pairing stabilizes highly electron-deficient metal centers. Higher hexene incorporation in copolymerization of ethene was observed by Waymouth and co-workers using methylaluminoxane (MMAO) instead of borane catalysts (Reybuck, S. E., et al., *Macromolecules* 38:2552-2558 (2005)). Therefore, the same transition metal pre-catalyst activated by different co-catalysts may show different polymerization characteristics, and having weak ion pairing after activation will yield high propagation rates and high comonomer incorporation level.

There is a need, for a method that produces of isotactic stereoblock polyolefin. Additionally, there is a need for a method that can be used to modulate the different grades of isotactic stereoblock polyolefin materials of varying average block length.

BRIEF SUMMARY OF THE INVENTION

The present invention provides a method of producing a polyolefin composition comprising:

(a) contacting a metallocene pre-catalyst and a co-catalyst, wherein the metallocene pre-catalyst has the formula:

A-Z—B  (I);

wherein A has the formula (II):

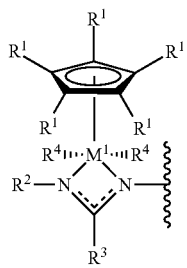

(II)

B has the formula (III):

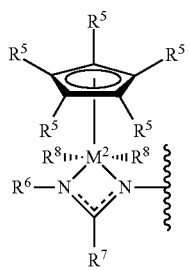

(III)

wherein the dotted lines in A and B indicate a delocalized bond;

$M^1$ and $M^2$ are each independently Ti, Zr, or Hf;

Z is a linker covalently linking A with B;

$R^1$ and $R^5$ are each independently hydrogen, alkyl, cycloalkyl, optionally substituted phenyl, or two adjacent $R^1$ or $R^5$ form an aromatic ring;

$R^2$, $R^3$, $R^6$, and $R^7$ are each independently alkyl, cycloalkyl, $Si(alkyl)_3$, $Si(aryl)_3$, phenyl, optionally substituted phenyl, or alkylphenyl; and $R^4$ and $R^8$ are each independently halogen, alkyl, cycloalkyl, aryl, or arylalkyl;

(b) adding a metal alkyl;

(c) adding a first olefin monomer; and (d) polymerizing by living coordinative chain transfer the first olefin monomer for a time sufficient to form the polyolefin.

In some embodiments, $M^1$ and $M^2$ are the same and are Hf or Zr.

In some embodiments, $R^1$ and $R^5$ are the same and are selected from the group consisting of ethyl, methyl, iso-butyl, n-hexyl, n-propyl, and t-butyl.

In some embodiments, $R^4$ and $R^8$ are the same and are selected from the group consisting of ethyl, methyl, iso-butyl, n-hexyl, n-propyl, and t-butyl.

In some embodiments, $R^2$ and $R^6$ are the same and are selected from the group consisting of ethyl, methyl, iso-butyl, n-hexyl, n-propyl, and t-butyl.

In some embodiments, Z is $-(CH_2)_w$ and w is 2-20.

In some embodiments, the metal alkyl is $Zn(R^{11})_2$ and wherein $R^{11}$ is selected from the group consisting of ethyl, methyl, iso-butyl, n-hexyl, n-propyl, and t-butyl.

In some embodiments, the metal alkyl is $ZnEt_2$.

In some embodiments, the metallocene pre-catalyst and the co-catalyst are contacted at a temperature of about $-20°$ C. to about $25°$ C.

In some embodiments, the metallocene pre-catalyst and the co-catalyst are contacted at a temperature of about $-20°$ C. to about $0°$ C.

In some embodiments, the first olefin monomer is ethene, propene, 1-butene, 1-pentene, 1-hexene, 1-heptene, 1-octene, styrene, butadiene, isoprene, α-methyl styrene, acrylonitrile, methyl acrylate, methyl methacrylate, vinyl acetate, vinyl chloride, vinyl fluoride, vinylidene chloride, N-vinyl pyrrolidone, 3-methylbutene, 3-methyl-1-pentene, vinylcyclohexane, vinylcyclobutane, vinylcyclopentane, vinylcyclooctane, 1-decene, enantiomerically pure β-citronellene, 3,5,5-trimethyl-1-hexene, cyclopentene, vinylcyclohexene, or 4-methyl-1-pentene.

In some embodiments, the first olefin monomer is propene.

In some embodiments, the metallocene pre-catalyst is $[(\eta^5-C_5Me_5)Zr(Me)_2]_2[N(tBu)C(Me)N-(CH_2)_4-NC(Me)N(tBu)]$, $[(\eta^5-C_5Me_5)Zr(Me)_2]_2[N(tBu)C(Me)N-(CH_2)_6-NC(Me)N(tBu)]$, or $[(\eta^5-C_5Me_5)Zr(Me)_2]_2[N(tBu)C(Me)N-(CH_2)_8-NC(Me)N(tBu)]$.

In some embodiments, the co-catalyst is $[PhNHMe_2][B(C_6F_5)_4]$.

In some embodiments, the metallocene pre-catalyst and the co-catalyst are contacted in a metallocene pre-catalyst: co-catalyst ratio of about 1:2.

In some embodiments, the metallocene pre-catalyst and the metal alkyl are contacted in a metallocene pre-catalyst: metal alkyl ratio of about 1:100 to about 1:1.1.

In some embodiments, the metallocene pre-catalyst and the metal alkyl are contacted in a metallocene pre-catalyst: metal alkyl ratio of about 1:20 to about 1:1.1.

In some embodiments, the polyolefin is an isotactic stereoblock polyolefin.

In some embodiments, the polyolefin is isotactic stereoblock polypropene.

The present invention provides a method of producing a polyolefin composition comprising:

(a) contacting a metallocene pre-catalyst selected from the group consisting of $[(\eta^5\text{-}C_5Me_5)Zr(Me)_2]_2[N(tBu)C(Me)N\text{---}(CH_2)_4\text{---}NC(Me)N(tBu)]$, $[(\eta^5\text{-}C_5Me_5)Zr(Me)_2]_2[N(tBu)C(Me)N\text{---}(CH_2)_6\text{---}NC(Me)N(tBu)]$, and $[(\eta^5\text{-}C_5Me_5)Zr(Me)_2]_2[N(tBu)C(Me)N\text{---}(CH_2)_8\text{---}NC(Me)N(tBu)]$ with the co-catalyst $[PhNMe_2H][B(C_6F_5)_3Me]$;

(b) adding $ZnEt_2$;

(c) adding a first olefin monomer; and (d) polymerizing by living coordinative chain transfer olefin first olefin monomer for a time sufficient to form said polyolefin.

DETAILED DESCRIPTION OF THE INVENTION

Figure 1:
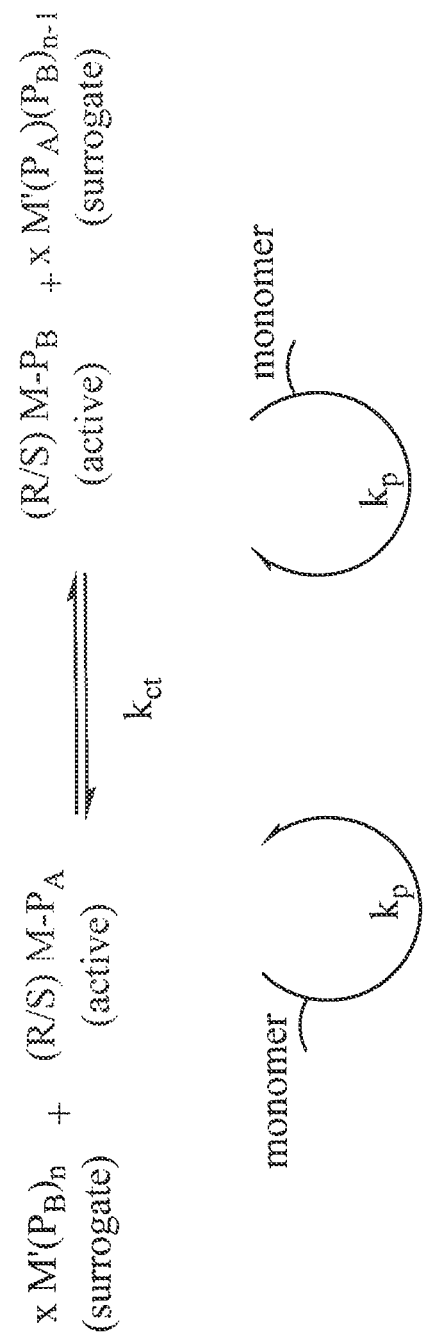
FIG. 1 shows a schematic of the rapid and reversible polymeryl group (chain) transfer between active transition-metal propagating centers ($M\text{-}P_A$) and excess equivalents of inactive main-group-metal alkyl species ($M'(P_B)$) serving as 'surrogate' chain growth sites.

"Metallocene" is used herein to mean any organometallic coordination complex containing at least one or more σ-bonded or η″-bonded ligands coordinated with a metal atom from Groups IIIB to VIII or the Lanthanide series of the Periodic Table of the Elements. An example of a σ-bonded or η″-bonded ligand is the cyclopentadienyl ring. Examples of the metal atoms are the metals of Group IVB such as titanium, zirconium, or hafnium.

A stereoregular macromolecule is understood to be a macromolecule that comprises substantially one species of stereorepeating unit. Examples include, but are not limited to, an isotactic macromolecule, a syndiotactic macromolecule, and an atactic macromolecule. A stereoblock macromolecule is understood to be a block macromolecule composed of at least one or more stereoregular, and possibly, non-stereoregular blocks.

An atactic polymer is a regular polymer, the molecules of which have equal numbers of the possible configurational base units in a random sequence distribution. In an atactic polymer, the polymer microstructure will contain stereo centers along the polymer backbone that have random relative configurations.

An isotactic polymer is a polymer in which all the substituents are located on the same side of the macromolecular backbone.

An amorphous polymer is a polymer in which there is no long-range order amongst different polymer chains that would impart crystallinity to the material.

As used herein, the term "polyolefin" comprises olefin homopolymers, co-polymers, and block copolymers.

The term "about" is used herein to mean the given number plus or minus 1 to 10%.

"Living polymerization" is used herein to mean a polymerization process with substantially no chain-growth stopping reactions, such as irreversible chain transfer and chain termination. Living polymerization allows for control over molecular weights and provide narrow molecular weight distributions, "Dormant species" is used to mean a species that cannot actively engage in propagation through chain enchainment of the monomer until it is converted into an active species through a reversible chemical process, such as a polymer chain coordinated to a neutral metal center. "Active species" is used in mean a species that can engage in propagation through chain enchainment of the monomer, such as a polymer chain coordinated to a cationic metal center. "Surrogate species" is used to define a main group metal alkyl that cannot engage in direct propagation through chain-enchainment of monomer but that can engage in reversible polymer chain transfer with an active or dormant species with a rate of chain-transfer that is at least equal in magnitude to that of the rate of propagation but preferably several times faster.

Monomodal in molecular weight distribution (MWD) is used herein to mean a composition of polymers that comprise one distinct molecular weight distribution. Typically, the MWD is a range of molecular weights that may range in a number average molecular weight ($M_n$) of about 500 Da to about 500,000 Da. The MWD of a polymer can be measured using any method known to one skilled in the relevant art, for example, size exclusion chromatography and gel permeation chromatography (GPC).

"Polydispersity index" is used herein as a measure of the MWD for a given polymer composition. A polydispersity index of one refers to a monodisperse composition. The polydispersity index is a ratio of weight average molecular weight ($M_w$) to number average molecular weight ($M_n$). In some embodiments, polyolefin compositions made according the present invention have low polydispersity index, for example, about 1.01-1.40. In some embodiments, the polyolefin compositions made according to the present invention have a polydispersity index between 1.01 and 1.8 between 1.1 and 1.8, between 1.2 and 1.8, between 1.3 and 1.8, between 1.4 and 1.8, between 1.5 and 1.8, between 1.01 and 1.7, between 1.1 and 1.7, between 1.2 and 1.7, between 1.3 and 1.7, between 1.4 and 1.7, between 1.5 and 1.7, between 1.01 and 1.6, between 1.1 and 1.6, between 1.2 and 1.6, between 1.01 and 1.5, between 1.1 and 1.5, between 1.2 and 1.5, between 1.3 and 1.5, between 1.01 and 1.4, between 1.1 and 1.4, between 1.2 and 1.4, between 1.01 and 1.3, or between 1.1 and 1.3. A polydispersity index may also be within the range of 1.2-1.8 and still be classified as having been produced by the present invention if the rate of reversible chain-transfer between active and surrogate species is close in magnitude to the rate of propagation of the active species.

Coordinative chain-transfer polymerization (CCTP) employs added equivalents of a metal alkyl that can serve in the capacity of "surrogate" metal chain-growth sites. CCTP employs highly efficient and reversible chain (polymeryl group, $P_A$ and $P_B$) transfer between active transition metal propagating centers ($M_A$) and chain-growth-inactive main group metal alkyl centers ($M_B$). If the rate constant for chain-transfer exchange between the active and inactive metal centers, $k_{ct}$, is several times greater than the rate constant for propagation, $k_p$, then both the transition and main group metal centers will effectively appear to engage in chain-growth propagation at the same rate while also maintaining all the desired features of a living polymerization (Hustad, P. D., et al., *Macromolecules* 41:4081-4089 (2008); Müller, A. H. E., et al., *Macromolecules* 28:4326-4333 (1995)). Indeed, under these conditions, $X_n$, will be governed by both the quantity of monomer consumed and the total concentration of all polymeryl groups, $P_A$ and $P_B$, that are formally engaged in active chain growth and more precisely by: $X_n=\{[monomer]_t-[monomer]_0\}/([(M-P_A)^++(n)(M'-P_B)]_0)$; where n is the number of equivalent polymeryl groups per main group metal (e.g. n=2 for $ZnR_2$). The molecular weight polydispersity index, D ($=M_w/M_n$), will further be approximately determined by the relative magnitudes of the rate constants for these two processes according to: $D \approx 1+(k_p/k_{ct})$ (Müller, A. H. E., et al., *Macromolecules* 28:4326-4333 (1995)). Finally, the quantity of polymer product is clearly no longer capped by the amount of transition metal catalyst, but rather, on the total molar equivalents of the much less expensive and readily available main group metal alkyl ($M_B$) that is employed.

Although highly desirable for beating the 'one polymer chain per active metal center' restriction of living Ziegler-Natta polymerizations, CCTP has only been successfully demonstrated in non-living fashion for ethene polymerization and for the 'chain-shuttling' copolymerization of ethene and 1-octene employing two different single-site catalysts for the production of 'blocky' polyolefin copolymers ((for a recent review and references for CCTP of ethene using main group metal alkyls, see: Kempe, R., *Chem. Eur. J.* 13: 2764-2773 (2007); Pelletier, J. F., et al., *Angew. Chem. Int. Ed. Engl.* 35:1854-1856 (1996); Chenal, T., et al., *Polymer* 48:1844-1856 (2007); Britovsek, G. J. P., et al., *Angew. Chem. Int. Ed.* 41:489-491 (2002); Britovsek, G. J. P., et al., *J. Am. Chem. Soc.* 126:10701-10712 (2004); van Meurs, M., et al., *J. Am. Chem. Soc.* 127:9913-9923 (2005); Rogers, J. S., et al., *Chem. Commun.* 1209-1210 (2000); Bazan, G. C., et al., *Organometallics* 20:2059-2064 (2001); Mani, G., et al., *Organometallics* 23:4608-4613 (2004); Mani, G., et al., *Angew. Chem. Int. Ed.* 43:2263-2266 (2004); Ganesan, M., et al., *J. Organomet Chem.* 690:5145-5149 (2005); Kretschmer, W. P., et al., *Chem. Eur. J.* 12:8969-8978 (2006)); (for a 'chain-shuttling' process based on the concept of CCTP with two different catalysts and diethyl zinc ($ZnEt_2$) for the copolymerization of ethene/1-octene that produces 'blocky' poly(ethene-co-1-octene), see; Arriola, D. J., et al., *Science* 312:714-719 (2006); Hustad, P. D., et al., *Macromolecules* 40:7061-7064 (2007); Hustad, P. D., *Macromolecules* 41:4081-4089 (2008))).

For successful realization of CCTP under living or non-living conditions, it has already been convincingly demonstrated that substantial difficulties exist in identifying the right combinations of pre-catalyst, co-catalyst, main group metal alkyl chain-transfer agent, and polymerization conditions under which rapid, reversible, and highly efficient chain-transfer (including chain-shuttling between two different active propagating centers) can occur (van Meurs, M., et al., *J. Am. Chem. Soc.* 127:9913-9923 (2005); Alfano, F., et al., *Macromolecules* 40:7736-7738 (2007)).

Living coordinative chain transfer polymerization (LC-CTP) can be considered as degenerative chain-transfer coordination polymerization, which is mechanistically distinct from a living degenerative group transfer coordination polymerization process. See Zhang, Y., et al., *J. Am. Chem. Soc.* 125:9062-9069 (2003); Zhang, Y., et al., *J. Am. Chem. Soc.* 126:7776-7777 (2004); Harney, M. B., et al., *Angew. Chem. Int. Ed.* 45:2400-2404 (2006); and Harney, M. B., et al., *Angew. Chem. Int. Ed.* 45:6140-6144 (2006)).

LCCTP is based on the rapid and reversible polymeryl group (chain) transfer between active transition-metal propagating centers and excess equivalents of inactive main-group-metal alkyl species serving as 'surrogate' chain growth sites as shown in FIG. 1. Under conditions were the rate and rate constant for reversible chain transfer is far greater in magnitude than those for chain growth propagation, i.e., $v_{ct}$ ($k_{ct}$)$>>$$v_p$($k_p$), both populations of active and surrogate sites appear to propagate at the same rate; with the final yield of precision polyolefin now being a function of the total amount of the relatively inexpensive main-group-metal surrogate that is employed, rather than that of an expensive transition-metal initiator. The mechanism of FIG. 1 provides many other desirable features of a living polymerization, however, to date, the stereoselective LCCTP of α-olefins, and in particular, of commercially-relevant propene, remains unfulfilled. The primary challenge is that under the conditions of $v_{ct}>>v_p$, the high frequency of reversible chain transfers that occur between a surrogate and equal populations of the two enantiomeric forms (e.g., R and S) comprising a racemic (R/S) mixture of a chiral active transition-metal propagator will serve the generate a random (atactic) arrangement of the relative configurations of stereo centers along the polymer backbone of the final polyolefin product—even if each chain growth insertion of the α-olefin monomers proceeds at the active site with a high degree of enantioface stereoselectivity, or even with stereospecificity (i.e., 100% stereoselective). Although the simple solution to this problem would be to employ an enantiomerically-pure transition-metal initiator in order to insure that each reversible chain transfer event occurs between the active species with the same absolute configuration (Alfano, F., et al., *Macromolecules* 40:7736-7738 (2007)), in practice, this strategy is difficult due to the notoriously low configurational stability of transition-metal complexes when chirality resides at the metal center, as well as, challenges associated with the optical resolution of such complexes.

Figure 2:
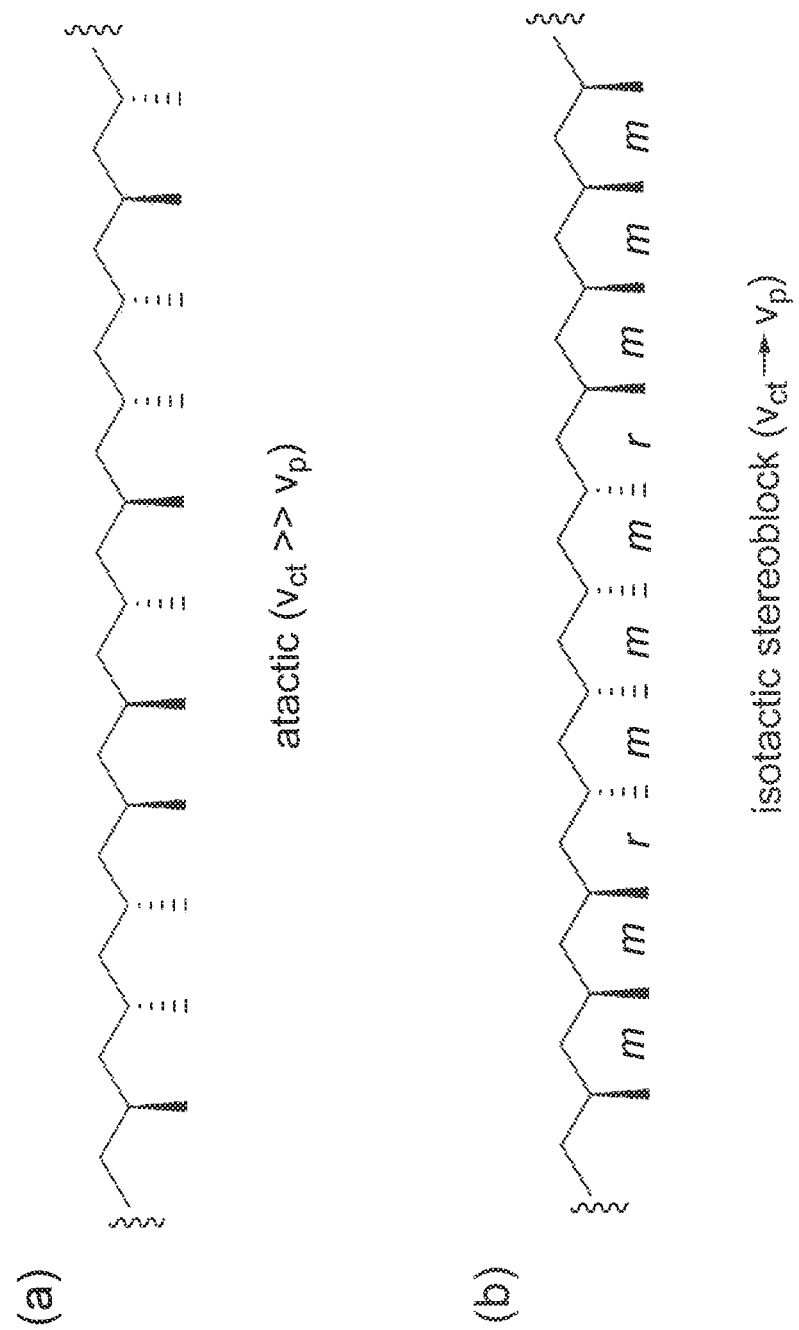
FIG. 2 shows a schematic of (a) atactic stereoblock material obtained when the rate and rate constant for reversible chain transfer is far greater in magnitude than those for chain growth propagation, i.e., $v_{ct}(k_{ct}) \gg v_p(k_p)$; and (b) isotactic stereoblock material obtained when the rate and rate constant for reversible chain transfer is of a similar magnitude to those for chain transfer propagation ($v_{ct}$ is relative in magnitude to $v_p$).

FIG. 2 presents the basis for an alternative strategy for obtaining stereoselectivity during LCCTP when a racemic mixture of a chiral (isoselective) transition-metal propagator is employed. By attenuating the magnitude of $v_{ct}$, relative to $v_p$, a longer run of an isotactic sequence within the growing polymer chain can be established prior to a chain transfer event involving a surrogate species. Upon back-chain-transfer, an equal probability then exists for the polymer chain to return to an active propagator with either the same absolute configuration (i.e., handedness), which would serve to extend the isotactic sequence in the propagating chain even further, or with the opposite handedness, which would serve to generate an isotactic stereoblock microstructure that is distinguished by the presence of $(m)_x mr(m)_y$ (e.g., mmrm pentad and mmmrmm heptad) stereosequences as depicted in FIG. 2. In this scenario, because isotactic block length is a function of the frequency of reversible chain transfer, the ability to exert external control over $v_{ct}$, and $v_p$ in programmed fashion can be used generate a family of different grades of isotactic stereoblock polypropene materials of varying average block length. While remaining strictly living in character, one important consequence of pursuing this strategy is that the molecular weight distributions, as characterized by the polydispersity index, D, of the isotactic stereoblock polypropene materials should increase, as $k_{ct}$ approaches $k_p$ since $D \approx 1+(k_p/k_{ct})$ for a 'two-state' living polymerization such as that depicted in FIG. 2. See Müller, A. H., et al., *Macromolecules* 28:4326-4333 (1995).

A significant obstacle to overcome has been targeting a reduction in the rate of reversible chain-transfer between active and surrogate species—while keeping all other kinetic parameters for processes occurring at the active center the same, or nearly the same. Mononuclear propagators are severely handicapped in this respect due to the short length scale over which changes in non-bonded steric interactions are efficiently transmitted about the transition metal center. Thus, increasing the magnitude of these local steric interactions as a means by which to inhibit intermolecular chain transfer can have a simultaneous negative impact on the rate of propagation and enantioface selectivity due to steric crowding of the monomer coordination site. One the other hand, dinuclear bis-propagators for the coordination polymerization of olefins, in which two active sites are held in close proximity to one another via either a rigid or flexible molecular tether, are characterized by an intrinsically much more complex steric environment that now includes steric interactions between the two growing polymeryl chains, as well as with two large counteranions. Since these steric interactions occur at a distance from the immediate coordination environment of the transition-metal, an increase in their magnitude will not necessarily have as significant of an impact on the active sites.

Figure 3:
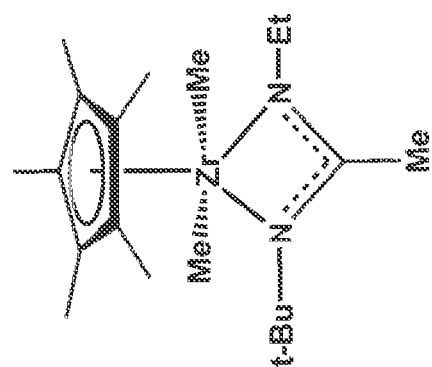
FIG. 3 shows the chemical structure of the mononuclear pre-catalyst $(\eta^5\text{-}C_5Me_5)Zr(Me)_2[N(Et)C(Me)N(tBu)]$.

Cationic, monocyclopentadienyl, monoamidinate group 4 metal methyl complexes of the formula, $\{(\eta^5-C_5R_5)M[\eta^2-N(R_1)C(R_2)N(R_3)](Me)\}^+[B(C_6F_5)_4]^-$, wherein M=Zr or Hf, that are derived from the corresponding neutral dimethyl precursors and a stoichiometric equivalent of the borate, $[PhNHMe_2][B(C_6F_5)_4]$, can serve as structurally-well-defined initiators for the LCCTP of ethene, propene, longer-chain β-olefins, cycloalkenes and α,ω-nonconjugated dienes in toluene solution when using excess equivalents of dialkylzinc ($ZnR_2$) or trialkylaluminum ($AlR_3$) reagents as chain growth surrogates. See W. Zhang and L. R. Sita, *J. Am. Chem. Soc.* 130:442-443 (2008); W. Zhang and L. R. Sita, *Macromolecules* 41:7829-7833 (2008); Wei, J., et al., *Angew. Chem. Int. Ed.* 49:1768-1772 (2010); Wei, J., et al., *Angew. Chem. Int. Ed.* 49:9140-9144 (2010); and L. R. Sita, *Angew. Chem. Int. Ed.* 48:2464-2472 (2009). And, the cationic initiator derived from a racemic mixture of the chiral $C_1$-symmetric derivative rac-1 shown in FIG. 3 can effect the living, isotactic polymerization of α-olefins, which is highly stereoselective in the case of propene (mmmm pentad=0.70, σ=enantioface selectivity=0.92), and stereospecific in the case of 1-hexene (mmmm and σ>0.98). See K. C. Jayaratne and L. R. Sita, *J. Am. Chem. Soc.* 122:958-959 (2000); K. C. Jayaratne and L. R. Sita, *J. Am. Chem. Soc.* 122: 10490-10491 (2000); Zhang, Y., et al., *J. Am. Chem. Soc.* 125:9062-9069 (2003); Harney, M. B., et al., *Angew. Chem. Int. Ed.* 45:2400-2404 (2006); Harney, M. B., et al., *Angew. Chem. Int. Ed.* 45:6140-6144 (2006). However, when $(\eta^5-C_5R_5)Zr[\eta^2-N(tBu)C(Me)N(Et)](Me)$ (1) was employed for the LCCTP of propene using 20 equivalents of $ZnEt_2$ under the standard conditions of Table 1 (run 1), the polypropene product obtained, while of narrow polydispersity, was amorphous in nature due to a very low degree of microstructural stereoregularity as confirmed by $^{13}C$ NMR stereochemical microstructure analysis, i.e., atactic for a mmmm of 0.253 (see Table 1). See Busico, V., et al., *Macromolecules* 30:6251-6263 (1997) and V. Busico and R. Cipullo, *Prog. Poly. Sci.* 26:433-533 (2001). Similar to all related dimethyl derivatives, 1 is configurationally unstable in solution due to a low energy barrier (e.g., $\Delta G^\ddagger<10.5$ kcal/mol) for metal-centered racemization that proceeds via facile 'amidinate ring-flipping.' See L. R. Sita and J. R. Babcock, *Organometallics* 17:5228-5230 (1998) and Koterwas, L. A., et al., *Organometallics* 18:4183-4190 (1999). In addition, all efforts to obtain diastereomerically- and enantiomerically-pure analogues of 1 through incorporation of stereogenic centers on the amidinate fragment failed due to resultant inactivity for polymerization that is attributed to an olefin coordination site that is highly sensitive to steric crowding. See Chang. Y., et al., *Organometallics* 23:351243520 (2004) and Kissounko, D. A., et al., *Inorg. Chim. Acta* 345:121-129 (2003).

Figure 4:
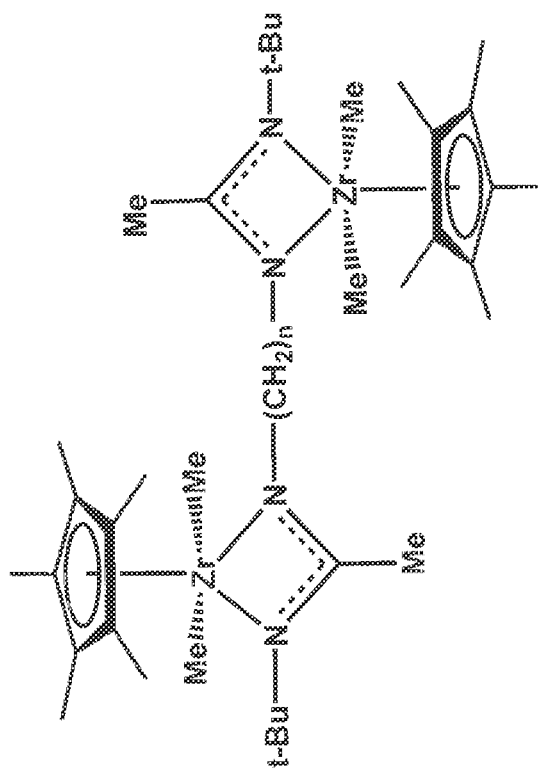
FIG. 4 shows the chemical structure of the binuclear pre-catalyst $[(\eta^5\text{-}C_5Me_5)Zr(Me)_2]_2[N(tBu)C(Me)N\text{---}(CH_2)_n\text{---}NC(Me)N(tBu)]$.

While investigating the fast and reversible methyl group exchange between active (configurationally stable), cationic polymeryl species and inactive (configurationally unstable) neutral, methyl, polymeryl dormant states derived from $\{(\eta^5-C_5R_5)M[\eta^2-N(R_1)C(R_2)N(R_3)](Me)\}^+[B(C_6F_5)_4]^-$, wherein M=Zr it Hf, a series of closely-related tethered dinuclear bis-propagators were prepared and characterized that exist as a mixture of meso- and rac-diastereomers in solution as derived from the corresponding precursors wherein n2, 3, and 4 shown in FIG. 4. Cationic active sites in the dinuclear bis-propagators were found to be configurationally stable in solution and display nearly the same degree of enantioface selectivity and activity for propene polymerization as can be achieved using mono-nuclear 1 (cf, σ=0.89 for n=2; σ=0.91 for n=3; σ=0.92 for n=4). See W. Zhang and L. R. Sita, *Adv. Synth. Catal.* 350:439-447 (2008). Higher barriers for metal-centered epimerization were observed for neutral methyl, polymeryl dormant states in these dinuclear systems, with the barrier height increasing further as the two transition-metal centers are brought closer together with a shortening of the molecular tether (i.e., proceeding from 4 to 3 to 2). Importantly, these results provided the first evidence that an increase in remote, regional steric interactions within a dinuclear bis-propagator can favorably modulate the rate of a process that is competitive with chain growth propagation without having a detrimental effect on the latter.

The present invention provides a method of producing a polyolefin composition comprising contacting a binuclear metallocene pre-catalyst and a co-catalyst; adding a metal alkyl; adding a first olefin monomer; and polymerizing said first and second monomers for a time sufficient to form a polyolefin block copolymer.

In some embodiments, the binuclear metallocene pre-catalyst for use in the present invention has the formula (I):

A-Z—B    (I);

wherein A has the formula (II):

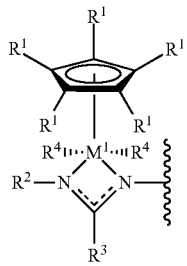

(II)

B has the formula (III):

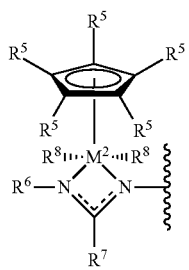

(III)

wherein the dotted lines in A and B indicate a delocalized bond;

$M^1$ and $M^2$ are each independently Ti, Zr, or Hf;

Z is a linker covalently linking A with B;

$R^1$ and $R^5$ are each independently hydrogen, alkyl, cycloalkyl, optionally substituted phenyl, or two adjacent $R^1$ or $R^5$ form an aromatic ring;

$R^2$, $R^3$, $R^6$, and $R^7$ are each independently alkyl, cycloalkyl, Si(alkyl)$_3$, Si(aryl)$_3$, phenyl, optionally substituted phenyl, or alkylphenyl; and $R^4$ and $R^8$ are each independently halogen, alkyl, cycloalkyl, aryl, or arylalkyl.

In some embodiments, A and B are the same. In embodiments where A and B are the same, the binuclear metallocene pre-catalyst has formula (IV):

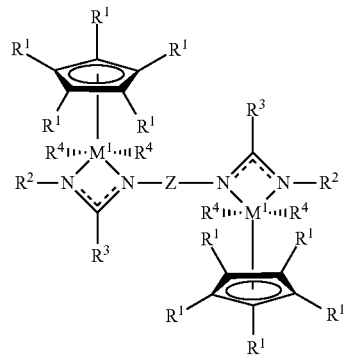

(IV)

wherein the dotted lines indicate a delocalized bond;

$M^1$ is Ti, Zr, or Hf;

Z is a covalent linker;

$R^1$ are each independently hydrogen, alkyl, cycloalkyl, optionally substituted phenyl, or two adjacent $R^1$ form an aromatic ring;

$R^2$ and $R^3$ are each independently alkyl, cycloalkyl, Si(alkyl)3, Si(aryl)$_3$, phenyl, optionally substituted phenyl, or alkylphenyl; and $R^4$ is halogen, alkyl, cycloalkyl, aryl, or arylalkyl.

In some embodiments, A and B are different. In embodiments where A and B are different, the binuclear pre-catalyst has the formula (V):

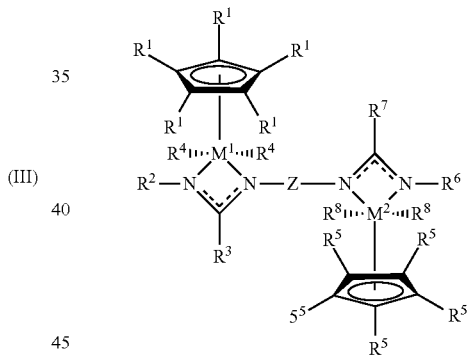

(V)

wherein the dotted lines indicate a delocalized bond;

$M^1$ and $M^2$ are each independently Ti, Zr, or Hf;

Z is a covalent linker;

$R^1$ and $R^5$ are each independently hydrogen, alkyl, cycloalkyl, optionally substituted phenyl, or two adjacent $R^1$ or $R^5$ form an aromatic ring;

$R^2$, $R^3$, $R^6$, and $R^7$ are each independently alkyl, cycloalkyl, Si(alkyl)$_3$, Si(aryl)$_3$, phenyl, optionally substituted phenyl, or alkylphenyl; and $R^4$ and $R^8$ are each independently halogen, alkyl, cycloalkyl, aryl, or arylalkyl.

In some embodiments, A and B are meso isomers. In some embodiments, A and B are racemic isomers; In some embodiments, the binuclear metallocene pre-catalyst contains a mixture of meso and racemic diastereomers.

In some embodiments, Z is optionally substituted —(CH$_2$)$_w$, wherein w is 2-20. In some embodiments, w is 4-10. In some embodiments, —(CH$_2$)$_w$ is optionally substituted with one or more amino, hydroxy, alkoxy, amide, alkyl, halogen, ketone, ester, —SO$_3$H, aldehyde, carboxylic acid, cyano, or nitro.

In some embodiments, Z is optionally substituted —$(CH_1)_y$—$(C_6H_4)$—$(CH_2)_y$, wherein each y is independently 1-10. In some embodiments, each y is independently 2-5. In some embodiments, w is 4-10. In some embodiments, —$(CH_2)_y$—$(C_6H_4)$—$(CH_2)_y$ is optionally substituted with one or more amino, hydroxy, alkoxy, amide, alkyl, halogen, ketone, ester, —$SO_3H$, aldehyde, carboxylic acid, cyano, or nitro.

As used herein, the term "alkyl" refers to straight-chain or branched-chain hydrocarbons having from 1 to 10 carbon atoms. In some embodiments, the alkyl is a $C_{1-10}$ alkyl. In some embodiments, the alkyl is a $C_{1-8}$ alkyl. In some embodiments, the alkyl is a methyl, ethyl, propyl, iso-propyl, iso-butyl, or t-butyl.

As used herein, the term "aryl" by itself or as part of another group refers to monocyclic, bicyclic, or tricyclic aromatic groups containing 6 to 14 carbon atoms in the ring position. In some embodiments, the aryl is a $C_{6-14}$ aryl. In some embodiments, the aryl is a $C_{6-10}$ aryl. In some embodiments, the aryl is a phenyl, naphthyl, indenyl, phenanthrenyl, anthracenyl, fluorenyl, or biphenyl.

As used herein, the term "arylalkyl" refers to an alkyl group mentioned above substituted by a single aryl group. In some embodiments, the arylalkyl is a benzyl, phenethyl, or naphthylmethyl.

As used herein, the term "alkylarylalkyl" refers to an alkyl group mentioned above substituted by a single aryl group, wherein the aryl group is further substituted by one or more alkyl groups. Examples include, without limitation, 4-methylbenzyl and 4-ethylphenethyl.

As used herein, the term "cycloalkyl" refers to cyclic alkyl groups containing between 3 and 8 carbon atoms having a single cyclic ring. In some embodiments, the cycloalkyl is a $C_{3-8}$ cycloalkyl. In some embodiments, the cycloalkyl is a cyclopropyl, cyclobutyl, cyclopentyl, or cyclooctyl.

As used herein, the term "optionally substituted phenyl" refers to a phenyl ring which may contain 1 to 5 electron donating or electron withdrawing groups. In some embodiments, the electron-donating optional substituent is amino, hydroxy, alkoxy, amide, aryl, or alkyl. In some embodiments, the electron-withdrawing substituent is halogen, ketone, ester, —$SO_3H$, aldehyde, carboxylic acid, cyano, nitro, or ammonium.

As used herein, the term "alkylphenyl" refers to an alkyl group mentioned above substituted by a single phenyl group. In some embodiments, the alkylphenyl is a benzyl, 1-phenethyl, 1-phenylpropyl, 1-phenylbutyl, 2-phenethyl, 2-phenylpropyl, 2-phenylbutyl, 3-phenylpropyl, and 3-phenylbutyl.

As used herein, the term "halogen" refers to fluoro, chloro, brown, and iodo.

As used herein, the term "aromatic ring" refers to an unsaturated carbocyclic group of 6 to 14 carbon atoms having a single ring (e.g., phenyl) or multiple condensed rings (e.g., naphthyl or anthryl).

The metallocene catalysts of the present invention can be prepared using any suitable method known to one skilled in the relevant art.

In some embodiments, the binuclear metallocene pre-catalyst is [($\eta^5$-$C_5Me_5$)Zr(Me)$_2$]$_2$[N(t-Bu)C(Me)N(CH$_2$)$_4$NC(Me)N(t-Bu)]. In some embodiments, the binuclear metallocene pre-catalyst is [($\eta^5$-$C_5Me_5$)Zr(Me)$_2$]$_2$[N(t-Bu)C(Me)N(CH$_2$)$_6$NC(Me)N(t-Bu)]. In some embodiments, the binuclear metallocene pre-catalyst is [($\eta^5$-$C_5Me_5$)Zr(Me)$_2$]$_2$[N(t-Bu)C(Me)N((CH$_2$)$_8$NC(Me)N(t-Bu)].

The co-catalyst is capable of activating the binuclear metallocene pre-catalyst, in some embodiments, the co-catalyst is one of the following: (a) ionic salts of the general formula [$A^+$][$BR^9_4$], wherein $A^+$ is Si($R^{10}$)$_3$, a cationic Lewis acid or a cationic Brønsted acid, B is the element boron, $R^9$ is phenyl or an optionally substituted phenyl or (b) a boron alkyl of the general formula $BR^9_3$ and each $R^{10}$ is independently selected from alkyl and optionally substituted phenyl. In some embodiments, the Lewis or Brønsted acids that may be used in the practice of the invention are tetra-n-butylammonium, triphenylcarbonium, and dimethylanilinium cations.

In some embodiments, the co-catalyst is [PhNHMe$_2$][B(C$_6$F$_5$)$_4$], [Ph$_3$C][B(C$_6$F$_5$)$_4$], or B(C$_6$F$_5$)$_3$. In some embodiments, the co-catalyst is [PhNHMe$_2$][B(C$_6$F$_5$)$_4$].

The co-catalyst can be a strongly coordinating co-catalyst or a weakly coordinating co-catalyst.

The metal alkyl is capable of activating reversible chain transfer with active transition metal-based propagating centers. In some embodiments, metal alkyls used in the practice of this invention include main group metal alkyls such as Zn($R^{11}$)$_2$ and Al($R^{11}$)$_3$, wherein $R^{11}$ is an alkyl. In some embodiments, mixtures comprised of two or more metal alkyls are used.

In some embodiments, the metal alkyl is AlEt$_3$, AlMe$_3$, Al(iso-butyl)$_3$, Al(n-hexyl)$_3$, Al(n-propyl)$_3$, or Al(t-butyl)$_3$. In some embodiments, the metal alkyl is AlEt$_3$. In some embodiments, the metal alkyl is Al(iso-butyl)$_3$. In some embodiments, the metal alkyl is Al(n-propyl)$_3$.

In some embodiments, the metal alkyl is ZnMe$_2$, ZnEt$_2$, Zn(n-butyl)$_2$, Zn(isoamyl)$_2$, Zn(t-butyl)$_2$, Zn(neopentyl)$_2$, Zn(n-propyl)$_2$, or Zn(isopropyl)$_2$. In some embodiments, the metal alkyl is ZnEt$_2$. In some embodiments, the metal alkyl is Zn(iso-propyl)$_2$. In some embodiments, a 1:1 mixture of AlEt$_3$ and ZnEt$_2$ is used.

The method of the present invention comprises contacting a binuclear metallocene pre-catalyst and a co-catalyst, adding a metal alkyl, then adding a first olefin monomer.

In some embodiments, a stoichiometric excess of a metal alkyl is used. "Stoichiometric excess" is used herein to mean an amount more than an equivalent amount of the binuclear metallocene pre-catalyst and/or the co-catalyst.

In some embodiments, the metal alkyl is added to the solution in a ratio of metal alkyl:binuclear metallocene pre-catalyst in the range of about 2.1:1 to about 1000:1 or about 2.1:1 to about 500:1. In some embodiments, the ratio of metal alkyl:binuclear metallocene pre-catalyst is in the range of about 2.1:1 to about 100:1. In some embodiments, the ratio of metal alkyl:binuclear metallocene pre-catalyst is in the range of about 2.1:1 to about 50:1. In some embodiments, the ratio of metal alkyl:binuclear metallocene pre-catalyst is about 2.1:1, 2.2:1, 2.5:1, 3:1, 4:1, 5:1, 10:1, 18:1, 20:1, 25:1, 50:1, 75:1, 100:1, or 200:1. In some embodiments, the ratio of the metal alkyl:binuclear metallocene pre-catalyst is 5:1, 10:1, or 20:1.

In some embodiments, the metal alkyl is added to the solution in a ratio of metal alkyl:co-catalyst in the range of about 1:1 to about 1000:1 or about 1:1 to about 500:1. In some embodiments, the ratio of metal alkyl:co-catalyst is in the range of about 1.1:1 to about 100:1. In another some embodiments, the ratio of metal alkyl:co-catalyst is in the range of about 1.1:1 to about 50:1. In some embodiments, the ratio of metal alkyl:co-catalyst is about 1.1:1, 1.2:1, 1.5:1, 1.8:1, 2:1, 2.2:1, 2.5:1, 3:1, 4:1, 5:1, 10:1, 18:1, 20:1, 25:1, 50:1, 75:1, 100:1, or 200:1. In some embodiments, the ratio of the metal alkyl:co-catalyst is 5:1, 10:1, or 20:1.

In some embodiments, the co-catalyst and binuclear metallocene pre-catalyst can be added together in a ratio of co-catalyst:binuclear metallocene pre-catalyst in the range of about 2:1 to about 20:1. In some embodiments, the ratio of co-catalyst:binuclear metallocene pre-catalyst is in the range of about 2:1 to about 10:1. In some embodiments, the ratio of co-catalyst:binuclear metallocene pre-catalyst is in the range of about 2:1 to about 5:1. In some embodiments, the ratio of co-catalyst:binuclear metallocene pre-catalyst is about 2:1, 2.2:1, 2.5:1, 3:1, 4:1, 5:1, 10:1, 18:1, or 20:1. In some embodiments, the ratio of the co-catalyst:binuclear metallocene pre-catalyst is 2:1.

The binuclear metallocene pre-catalyst and the co-catalyst can be contacted at the same time. In some embodiments, the binuclear metallocene pre-catalyst and co-catalyst can be contacted to form a composition which is then contacted with a metal alkyl.

The metallocene pre-catalyst and the co-catalyst can be contacted neat, or in some suitable solvent. Suitable solvents for use in the present invention include inert liquid hydrocarbons that are nonreactive under the polymerization conditions employed. In some embodiments, the solvent is chlorobenzene, dichlorobenzene, isopentane, hexane, cyclohexane, heptane, benzene, toluene, trifluorotoluene, pentane, octane, isooctane, or dichloromethane. In some embodiments, the solvent is chlorobenzene.

The metal alkyl can be added to the solution comprising the metallocene pre-catalyst and the co-catalyst neat, or in some suitable solvent. Suitable solvents for use in the present invention include inert liquid hydrocarbons that are nonreactive under the polymerization conditions employed. In some embodiments, the solvent is chlorobenzene, dichlorobenzene, isopentane, hexane, cyclohexane, heptane, benzene, toluene, trifluorotoluene, pentane, octane, isooctane, or dichloromethane. In some embodiments, the solvent is toluene.

The first olefin monomer can be added to the solution comprising the metallocene pre-catalyst, the co-catalyst, and the metal alkyl neat, or in some suitable solvent. Suitable solvents for use in the present invention include inert liquid hydrocarbons that are nonreactive under the polymerization conditions employed. In some embodiments, the solvent is chlorobenzene, dichlorobenzene, isopentane, hexane, cyclohexane, heptane, benzene, toluene, trifluorotoluene, pentane, octane, isooctane, or dichloromethane. In some embodiments, the first olefin monomer is added neat.

The metallocene pre-catalyst and the co-catalyst can be contacted at any temperature. In some embodiments, the temperature is between about −25° C. to about 80° C., between about −25° C. to about 40° C., between about −25° C. to about 30° C., between about −25° C. to about 20° C., between about −25° C. to about 10° C., between about −25° C. to about 0° C., between about −20° C. to about 40° C., between about −20° C. to about 30° C., between about −20° C. to about 20° C., between about −20° C. to about 10° C., between about −20° C. to about 0° C., between about −10° C. to about 40° C., between about −10° C. to about 30° C., between about −10° C. to about 20° C., between about −10° C. to about 10° C., between about −10° C. to about 0° C. between about 0° C. to about 40° C., between about 0° C. to about 30° C., between about 0° C. to about 20° C., or between about 0° C. to about 10° C. In one embodiment, the temperature is about 20° C. In some embodiments, the temperature is about −10° C.

The metal alkyl can be added to the solution of metallocene pre-catalyst and co-catalyst at any temperature, preferably, the temperature results in the formation of an active catalyst composition for olefin polymerizations. In some embodiments, the temperature is between about −25° C. to about 80° C., between about −25° C. to about 40° C., between about −25° C. to about 30° C., between about −25° C. to about 20° C., between about −25° C. to about 10° C., between about 25° C. to about 0° C., between about −20° C. to about 40° C., between about −20° C. to about 30° C., between about −20° C. to about 20° C., between about −20° C. to about 10° C., between about −20° C. to about 0° C., between about −10° C. to about 40° C., between about −10° C. to about 30° C., between about −10° C. to about 20° C., between about −10° C. to about 10° C. between about −10° C. to about 0° C., between about 0° C. to about 40° C., between about 0° C. to about 30° C., between about 0° C. to about 20° C., or between about 0° C. to about 10° C. In one embodiment, the temperature is about 20° C. In some embodiments, the temperature is about −10° C.

The first olefin monomer can be added to the solution of metallocene pre-catalyst, the co-catalyst, and the metal alkyl at any temperature, preferably, the temperature results in the formation of an active catalyst composition for olefin polymerizations.

After the first olefin monomer is added to the mixture of the metallocene pre-catalyst, the co-catalyst, and the metal alkyl, the reaction temperature can be any temperature. In some embodiments, the temperature is between about −25° C. to about 80° C., between about −25° C. to about 40° C., between about −25° C. to about 30° C., between about −25° C. to about 20° C., between about −25° C. to about 10° C., between about 25° C. to about 0° C., between about −20° C. to about 40° C., between about −20° C. to about 30° C., between about −20° C. to about 20° C., between about −20° C. to about 10° C., between about −20° C. to about 0° C., between about −10° C. to about 40° C., between about −10° C. to about 30° C., between about −10° C. to about 20° C., between about −10° C. to about 10° C., between about −10° C. to about 0° C., between about 0° C. to about 40° C., between about 0° C. to about 30° C., between about 0° C. to about 20° C., or between about 0° C. to about 10° C. In one embodiment, the temperature is about 20° C. In some embodiments, the temperature is about −10° C.

The metallocene pre-catalyst and the co-catalyst can be contacted for any length of time before addition of the metal alkyl. In some embodiments, the metallocene pre-catalyst and the co-catalyst are contacted for about 1 minute to about 50 hours, about 2 minutes to about 20 hours, about 5 minutes to about 10 hours, about 10 minutes to about 1 hour, about 10 minutes to about 40 minutes, or about 15 minutes to about 30 minutes before addition.

The metallocene pre-catalyst, the co-catalyst, and the metal alkyl can be contacted for any length of time before the first olefin monomer is added. In some embodiments, the metallocene pre-catalyst, the co-catalyst, and metal alkyl are contacted for about 1 minute to about 50 hours, about 2 minutes to about 20 hours, about 5 minutes to about 10 hours, about 10 minutes to about 1 hour, about 10 minutes to about 40 minutes, or about 15 minutes to about 30 minutes before addition. In some embodiments, the reaction is run for about 5 minutes before addition of the first olefin monomer.

After addition of the first olefin monomer, the reaction mixture can be run for any length of time. In some embodiments, the reaction is run for about 1 minute to about 50 hours, about 2 minutes to about 20 hours, about 5 minutes to about 10 hours, about 10 minutes to about 1 hour, about 10 minutes to about 40 minutes, or about 15 minutes to about 30 minutes after addition of the first olefin monomer.

The first olefin monomer can be added to the mixture of metallocene pre-catalyst, co-catalyst, and metal alkyl at any pressure. In some embodiments, the pressure is between about 0 psi to about 40 psi, about 2 psi to about 30 psi, about 3 psi to about 20 psi, or about 4 psi to about 10 psi. In some embodiments, the pressure is about 5 psi.

Olefin monomers for use in the invention include, but are not limited to, ethene, propene, 1-butene, 1-pentene, 1-hexene, 1-heptene, 1-octene, styrene, butadiene, isoprene, 3-methylbutene, 3-methyl-1-pentene, vinylcyclohexane, vinylcyclobutane, vinylcyclopentane, vinylcyclooctane, 1-decene, enantiomerically pure β-citronellene, 3,5,5-trimethyl-1-hexene, 4-methyl-1-pentene or cyclic olefins such as cyclobutene, cyclopentene, cyclohexane, cyclooctene, and alkyl or aryl-substituted cyclic olefins. Olefin monomers for use also include conjugated or non-conjugated dienes, such as linear, branched, or cyclic hydrocarbon dienes having from about 4 to about 20, preferably 4 to 12, carbon atoms, including those dienes having the formula:

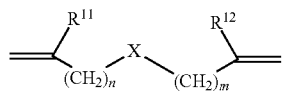

wherein X=CH$_2$, CO, N(R$^{13}$), O or S;
R$^{11}$, R$^{12}$ and R$^{13}$ are each independently H, alkyl or phenyl; and
n and m are each independently an integer from 0-5.

Dienes include 1,4-pentadiene, 1,5-hexadiene, 5-vinyl-2-norbornene, 1,7-octadiene, vinylcyclohexene, dicyclopentadiene, butadiene, isobutylene, isoprene and ethylidene norbornene.

In some embodiments of the present invention, the first olefin monomer is propene.

In some embodiments, a second olefin monomer is added. In some embodiments, the second olefin monomer is 1-hexene. In embodiments, the first olefin is propene and the second olefin is 1-hexene. In some embodiments, the first olefin in propene and the second olefin is 1-octene.

The ratio of first olefin monomer to second olefin monomer can be, but is not limited to, the range of 1:100 to 100:1. In some embodiments, the ratio of the first olefin monomer to the second olefin monomer is about 1:1 to about 1000:1 or about 1:1 to about 500:1. In some embodiments, the ratio of first olefin monomer:second olefin monomer is in the range of about 1.1:1 to about 100:1. In some embodiments, the ratio of first olefin monomer:second olefin monomer is in the range of about 1.1:1 to about 50:1. In some embodiments, the ratio of first olefin monomer:second olefin monomer is about 1.1:1, 1.2:1, 1.5:1, 1.8:1, 2:1, 2.2:1, 2.5:1, 3:1, 4:1, 5:1, 10:1, 18:1, 20:1, 25:1, 50:1, 75:1, 100:1, or 200:1.

The polymerization methods of the present invention are flexible and allow for the manufacture of polyolefin compositions having various molecular weights. The molecular weights that are given, therefore, are not meant to be limiting. For example, polyolefin compositions of the present invention have number average molecular weight (M$_n$) greater that about 500. More particularly, the polyolefin compositions have number average molecular weight of about 1,000 to about 500,000. Methods of determining number average molecular weight of polyolefin compositions are well known to one of ordinary skill in the art. For example, gel permeation chromatography (GPC) may be used.

Having now generally described this invention, the same will be understood by reference to the following examples which are provided herein for purposes of illustration only and are not intended to be limiting unless otherwise specified.

EXAMPLES

All manipulations were performed under an inert atmosphere of dinitrogen using either standard Sehlenk techniques or a Vacuum Atmospheres (Hawthorne, Calif.) glovebox. Dry, oxygen-free solvents were employed throughout. Toluene and chlorobenzene were refluxed over sodium metal and calcium hydride, respectively, and distilled under dinitrogen prior to use. Polymer grade propene was purchased from Matheson Tri-Gas (Basking Ridge, N.J.), and passed through active copper catalyst (GetterMax 135, Research Catalysts, Inc., The Woodlands, Tex.) and molecular sieves (4 Å) prior to polymerization. ($\eta^5$-C$_5$Me$_5$)Zr(Me)$_2$[N(Et)C(Me)N(tBu)] (1) and [($\eta^5$-C$_5$Me$_5$)Zr(Me)$_2$]$_2$[N(tBu)C(Me)N—(CH$_2$)$_n$—NC(Me)N(tBu)] 2 (n=4), 3 (n=6), and 4 (n=8) were prepared according to previously reported procedures. See Zhang, W., et al., *Adv. Synth. Catal.* 350:439-447 (2008). [PhNHMe$_2$][B(C$_6$F$_5$)$_4$] 5 was purchased from Boulder Scientific (Longmont, Colo.) and used without further purification. ZnEt$_2$ was added as a 1.1 M (15% wt) solution in toluene.

Gel permeation chromatography (GPC) analyses were performed using a Viscotek (Houston, Tex.) GPC system equipped with a column oven and differential refractometer both maintained at 40° C. and four columns (T2500, T3000, T4000, and T5000) also maintained at 40° C. Tetrahydrofuran was used as the eluent at a flow rate of 1.0 mL/min. M$_n$, M$_w$, and PDI (M$_w$/M$_w$) values were obtained using a Viscotek (Houston, Tex.) GPC with OmniSEC software (conventional calibration of ten polystyrene standards (M$_p$=580 Da to 3,150 kDa) (Polymer Laboratories, Amherst, Mass.).

$^{13}$C {$^1$H} $^1$H NMR spectra of polypropene samples were recorded using 30-40 mg/mL solutions of 1,1,2,2-tetrachloroethane-d$_2$ at 90° C. with a Bruker (The Woodlands, Tex.) AVIII-600 MHz spectrometer operating at 150 or 600 MHz, equipped with a Bruker (The Woodlands, Tex.) 5 mm C13/H1 dual probe with Z gradient. $^{13}$C {$^1$H} NMR spectra were recorded under the following conditions: 45° pulse; without Nuclear Overhauser Enhancement (NOE); acquisition time: 1.2 seconds; relaxation delay: 2.0 seconds; >10 K transients. Resonance was assigned based on the literature. See Busico, V., et al., *Macromolecules* 30:6251-6263 (1997); and Busico, V., et al., *Prog. Polym. Sci.* 26:443-533 (2001); Alfano, F., et al., *Macromolecules* 40:7736-7738 (2007).

Differential scanning calorimetry (DSC) analyses were performed using a TA (TA Instruments, New Castle, Del.) DSC Q1000 system at a heating and cooling rate of 5 or 10° C./min. All samples were prepared in hermetically sealed pans (8-10 mg/sample) and were run using an empty pan as a reference and empty cells as a subtracted baseline. The samples were scanned for multiple cycles to remove recrystallization differences between the samples and the results reported are of the second and third scans in the cycles.

Wide-angle X-ray diffraction (WAXD) measurements were carried out with all the samples measured in an as-prepared state with no further thermal annealing. 0.5 g of each polypropene sample was mounted on the sample holder and the measurement was performed on a Bruker (The Woodlands, Tex.) D8 Advance system with LynxEye detector. The wavelength of Cu Kα radiation was selected at λ=1.54 Å and the scan angle was 5~60° with a 0.05° step. The data was collected at room temperature and the amorphous halogen of each polypropene sample (except run 8 of Table 1) was subtracted by amorphous polypropene with arbitrary scale. The obtained profiles were fitted with built-in software (Advanced TOPAS, Florence, Ky.).

Example 1

General Procedure for Living Coordination Polymerization of Propene

In a 250 mL Sehlenk flask, 1.5 mL of cold chlorobenzene mixture of 0.025 mmol mononuclear pre-catalyst 1 and 0.025 mmol of co-catalyst 5 (run 5 of Table 1) or 0.0125 mmol binuclear pre-catalyst 3 and 0.025 mmol of co-catalyst 5 (run 9 of Table 1) were added to 18.5 mL chlorobenzene at −10° C. The flask was then pressurized to slightly above 1 atm (~5 psi) with propene and the pressure was maintained for a specific time with stirring before quenching with 0.5 mL of methanol. The chlorobenzene solution was precipitated into 600 mL of acidic methanol (10% concentrated HCl) to isolate the polymer. The final product was collected and dried overnight in vacuo before analysis.

General Procedure for Living Coordinative Chain-Transfer Polymerization (LCCTP) of Propene In a 250 mL Schlenk flask, 1.5 mL of cold chlorohenzene mixture of 0.025 mmol mononuclear pre-catalyst 1 and 0.025 mmol of co-catalyst 5 (runs 6-8 of Table 1) or 0.0125 mmol binuclear pre-catalyst 3 and 0.025 mmol of co-catalyst 5 (runs 10-12 of Table 1) were added to 18.5 mL, chlorobenzene at −10° C. A certain amount (according to Table 1) of 1.1 M (15 wt %) cold toluene solution of $ZnEt_2$ was added to the flask and stirred for 5 minutes. The flask was then pressurized to slightly above 1 atm (~5 psi) with propene and the pressure was maintained for a specific time with stirring before quenching with 0.5 mL of methanol. The chlorobenzene solution was precipitated into 600 mL of acidic methanol (10% concentrated HCl) to isolate the polymer. The final product was collected and dried overnight in vacuo before analysis.

NMR (600 MHz, 1,1,2,2-$C_2Cl_4O_2$, 90° C.) spectra of the polypropene products confirmed the living character of the polymerizations with no evidence of vinyl end-group resonances that might arise with chain termination via irreversible β-hydrogen transfer processes being detected. And, both $M_n$ and D values were observed to decrease with increasing molecular tether length—as expected for an increase in $v_{ct}$ ($k_{ct}$), relative to $v_p$ ($k_p$), due to a greater steric accessibility for bimolecular chain transfer as the two cationic active sites are moved increasingly farther apart within the series. This trend was observed for the $M_n$ and D values for the dinuclear pre-catalyst series: 2 ($M_n$=4.71 kDa, D=1.71)>3 ($M_n$=3.54 kDa, D=1.62)>4 ($M_n$=2.91 kDa, D=1.24). The $^{13}$C NMR stereochemical microstructural analysis data presented in Table 1 provide additional support for this conclusion. Firstly, it is important to deconvolute the mmmm pentad values of column 12 in order to separately account for the degree of polypropene stereoirregularity that arises from monomer enantioface selectivity (given by the sum of the mmmmrr, mmmrrm, and mmrrmm heptads of column 13) and the degree of stercoirregularity that manifests from reversible chain transfer (given by the sum of the mmmmmr, rmmmmr, mmmmrm, mrmmrm, and mmmrmm heptads of column 14). Once done, it can then be clearly seen from the latter values that $v_{ct}(k_{ct})$ does, in fact, increase for the dinuclear bis-propagators in the order: 2<3<4. Furthermore, the lower crystallinity of isotactic stereoblock polypropene obtained from 2 relative to that from 3 (cf. 9.6% vs. 16.3%, respectively, see Table 1) can be attributed to the former material having longer, but less stereoregular, stereoblock lengths due to a lower enantioface selectivity for the dinuclear bis-propagator with the shorter tether.

Further detailed comparisons using 1 and 3 under different LCCTP conditions are also shown in Table 1. For 1, increasing the concentration of surrogate relative to propagator had the anticipated effect of decreasing the isotactic block length (mmmm), melting temperature ($T_m$) and % crystallinity of the isotactic stereoblock polypropene until an amorphous, atactic material was obtained starting with 20 equivalents of $ZnEt_2$ as surrogate (runs 5-8). In contrast, LCCTP of propene using 3 under identical conditions provided a set of highly crystalline isotactic stereoblock poly-

TABLE 1

Results for LCCTP of propene using mononuclear and dinuclear initiators.

| Run | $I^a$ | $ZnEt_2$ (equiv)$^b$ | $t_p$ (h) | Yield (g) | $M_W$ (kDa)$^c$ | $M_n$ (kDa)$^c$ | D | $T_m$ (° C.)$^d$ | $T_g$ (° C.)$^d$ | % Cry$^e$ | mmmm$^f$ | mmmmmr + mmmrmm$^f$ | mmmmmr + rmmmmr + mmmmrm + mrmmrm + mmmrmm$^f$ |
|---|---|---|---|---|---|---|---|---|---|---|---|---|---|
| 1 | 1 | 20 | 15 | 1.39 | 3.25 | 2.85 | 1.14 | — | −26.4 | — | 0.253 | 0.106 | 0.383 |
| 2 | 2 | 20 | 23 | 1.48 | 8.07 | 4.71 | 1.71 | 86.3 | −22.5 | 9.6 | 0.467 | 0.282 | 0.094 |
| 3 | 3 | 20 | 23 | 1.37 | 5.72 | 3.54 | 1.62 | 100.9 | −27.4 | 16.3 | 0.555 | 0.169 | 0.159 |
| 4 | 4 | 20 | 23 | 1.10 | 3.59 | 2.91 | 1.24 | 83.9 | −27.3 | 1.5 | 0.362 | 0.134 | 0.281 |
| 5 | 1 | 0 | 3 | 0.36 | 30.4 | 24.6 | 1.23 | 111.9 | −10.6 | 23.6 | 0.694 | 0.184 | — |
| 6 | 1 | 5 | 10 | 0.80 | 6.10 | 4.97 | 1.23 | 93.4 | −18.9 | 10.7 | 0.557 | 0.160 | 0.184 |
| 7 | 1 | 10 | 20 | 1.81 | 5.81 | 4.92 | 1.18 | 76.1 | −17.7 | 5.2 | 0.490 | 0.149 | 0.256 |
| 8 | 1 | 20 | 30 | 2.06 | 4.40 | 3.93 | 1.12 | — | −22.5 | — | 0.318 | 0.134 | 0.365 |
| 9 | 3 | 0 | 3 | 0.32 | 31.9 | 24.9 | 1.28 | 114.8 | −8.5 | 23.7 | 0.697 | 0.187 | — |
| 10 | 3 | 5 | 10 | 0.72 | 8.98 | 4.09 | 2.20 | 106.6 | −22.2 | 18.7 | 0.630 | 0.184 | 0.093 |
| 11 | 3 | 10 | 20 | 1.48 | 8.96 | 3.57 | 2.51 | 107.6 | −20.4 | 21.9 | 0.652 | 0.176 | 0.094 |
| 12 | 3 | 20 | 30 | 1.80 | 4.27 | 2.50 | 1.71 | 95.3 | −27.1 | 12.3 | 0.565 | 0.174 | 0.166 |

Figure 5:
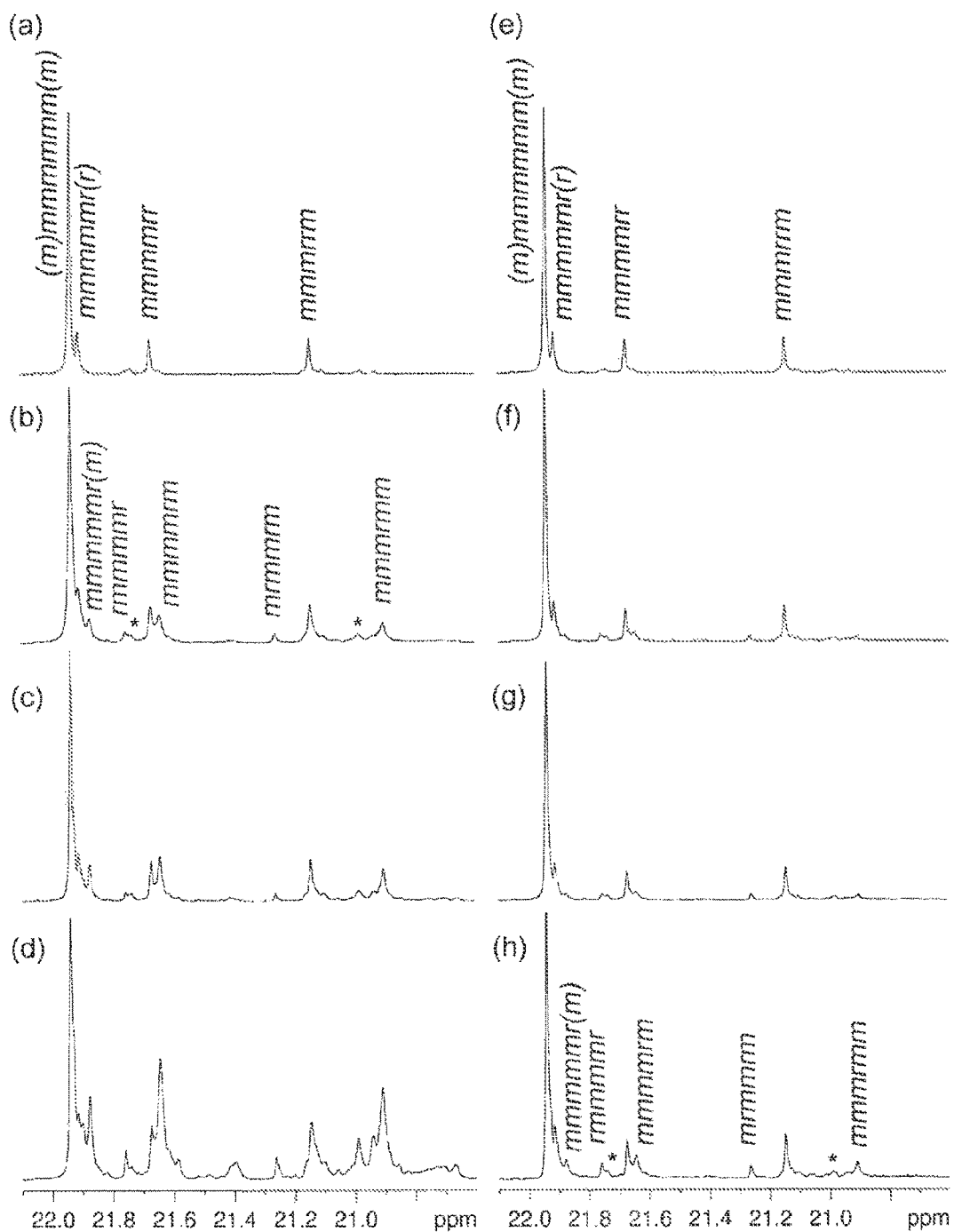
FIG. 5 shows the partial $^{13}C$ NMR spectra (150 MHz, $1,1,2,2\text{-}C_2Cl_4D_2$, 90° C.) for the methyl region of the polypropene materials obtained using (a) mononuclear pre-catalyst $(\eta^5\text{-}C_5Me_5)Zr(Me)_2[N(Et)C(Me)N(tBu)]$ and 0 equivalents of $ZnEt_2$; (b) mononuclear pre-catalyst $(\eta^5\text{-}C_5Me_5)Zr(Me)_2[N(Et)C(Me)N(tBu)]$ and 5 equivalents of $ZnEt_2$; (c) mononuclear pre-catalyst $(\eta^5\text{-}C_5Me_5)Zr(Me)_2[N(Et)C(Me)N(tBu)]$ and 10 equivalents of $ZnEt_2$; (d) mononuclear pre-catalyst $(\eta^5\text{-}C_5Me_5)Zr(Me)_2[N(Et)C(Me)N(tBu)]$ and 20 equivalents of $ZnEt_2$; (e) binuclear pre-catalyst $[(\eta^5\text{-}C_5Me_5)Zr(Me)_2]_2[N(tBu)C(Me)N\text{---}(CH_2)_6\text{---}NC(Me)N(tBu)]$ and 0 equivalents of $ZnEt_2$; (f) binuclear pre-catalyst $[(\eta^5\text{-}C_5Me_5)Zr(Me)_2]_2[N(tBu)C(Me)N\text{---}(CH_2)_6\text{---}NC(Me)N(tBu)]$ and 5 equivalents of $ZnEt_2$; (g) binuclear pre-catalyst $[(\eta^5C_5Me_5)Zr(Me)_2]_2[N(tBu)C(Me)N\text{---}(CH_2)_6\text{---}NC(Me)N(tBu)]$ and 10 equivalents of $ZnEt_2$; and (h) binuclear pre-catalyst $[(\eta^5\text{-}C_5Me_5)Zr(Me)_2]_2[N(tBu)C(Me)N\text{---}(CH_2)_6\text{---}NC(Me)N(tBu)]$ and 20 equivalents of $ZnEt_2$. Resonances marked with an asterisk are for end groups.

As shown in Table 1, the dinuclear bis-propagators derived from 2, 3, and 4 were effective for the LCCTP of propene starting with 20 equivalents of $ZnEt_2$ (runs 2-4). $^1$H propene samples for which mmmm, $T_m$ and % crystallinity remained fairly constant with increasing amounts of surrogate used, and with these values only beginning to erode at 20 equivalents of ZnEt$_2$ (runs 9-12). FIG. 5 presents the partial $^{13}$C NMR spectra for the methyl region for each of the isotactic stereoblock polypropene in which the dramatic differences in stereoregularity of the materials obtained from LCCTP using mononuclear 1 (FIGS. 5(a)-(d)) and dinuclear 3 (FIGS. 5(e)-(h)) can be qualitatively assessed.

Figure 6:
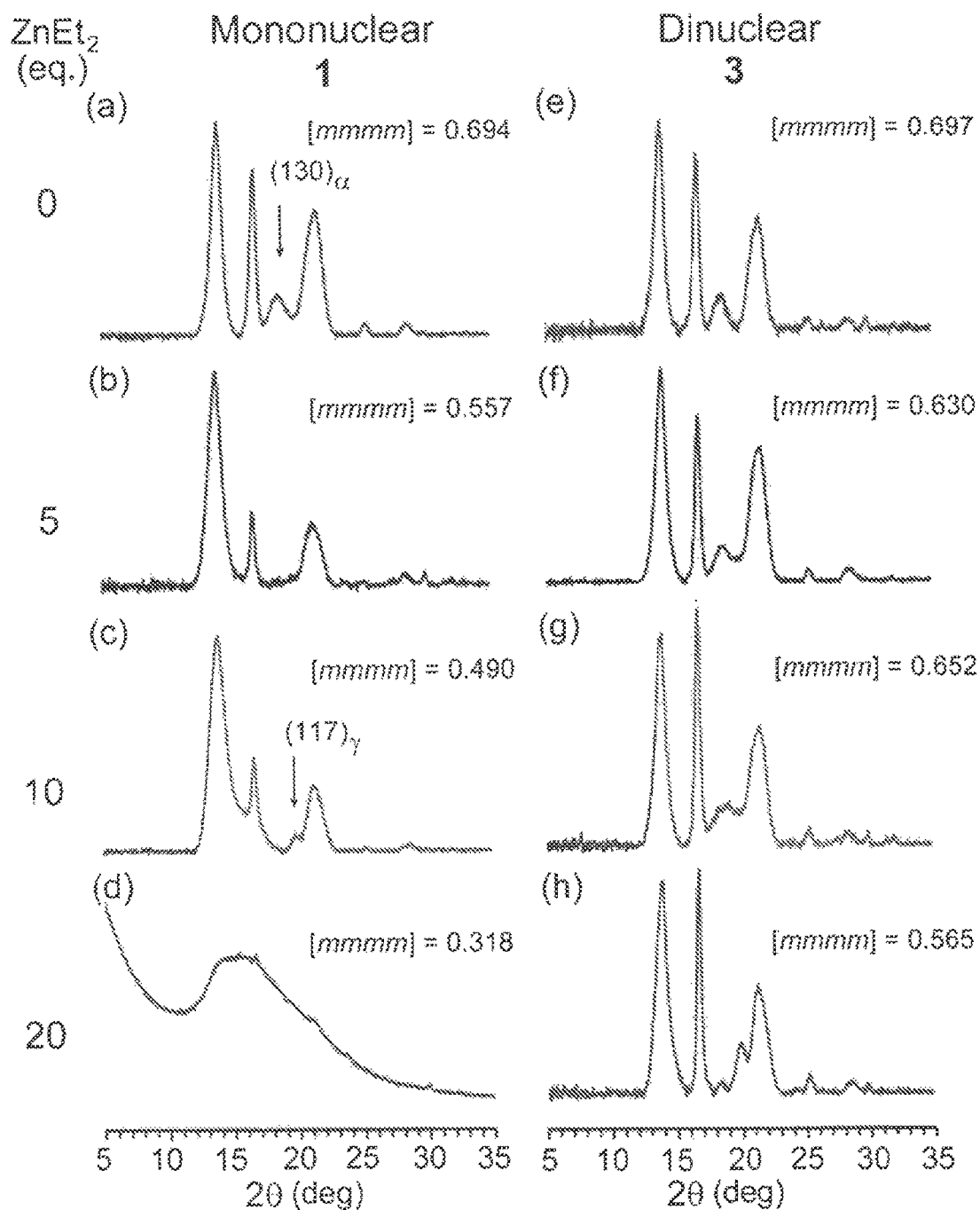
FIG. 6 shows the WAXD profiles of unannealed polypropene materials obtained using (a) mononuclear pre-catalyst $(\eta_5\text{-}C_5Me_5)Zr(Me)_2[N(Et)C(Me)N(tBu)]$ and 0 equivalents of $ZnEt_2$; (b) mononuclear pre-catalyst $(\eta^5\text{-}C_5Me_5)Zr(Me)_2[N(Et)C(Me)N(tBu)]$ and 5 equivalents of $ZnEt_2$; (c) mononuclear pre-catalyst $(\eta^5\text{-}C_5Me_5)Zr(Me)_2[N(Et)C(Me)N(tBu)]$ and 10 equivalents of $ZnEt_2$; (d) mononuclear pre-catalyst $(\eta^5\text{-}C_5Me_5)Zr(Me)_2[N(Et)C(Me)N(tBu)]$ and 20 equivalents of $ZnEt_2$; (e) binuclear pre-catalyst $[(\eta^5\text{-}C_5Me_5)Zr(Me)_2]_2[N(tBu)C(Me)N\text{---}(CH_2)_6\text{---}NC(Me)N(tBu)]$ and 0 equivalents of $ZnEt_2$; (f) binuclear pre-catalyst $[(\eta^5\text{-}C_5Me_5)Zr(Me)_2]_2[N(tBu)C(me)N\text{---}(CH_2)_6\text{---}NC(Me)N(tBu)]$ and 5 equivalents of $ZnEt_2$; (g) binuclear pre-catalyst $[(\eta^5\text{-}C_5Me_5)Zr(Me)_2]_2[N(tBu)C(Me)N\text{---}(CH_2)_6\text{---}NC(Me)N(tBu)]$ and 10 equivalents of $ZnEt_2$; and (h) binuclear pre-catalyst $[(\eta^5\text{-}C_5Me_5)Zr(Me)_2]_2[N(tBu)C(Me)N\text{---}(CH_2)_6\text{---}NC(Me)N(tBu)]$ and 20 equivalents of $ZnEt_2$.

Wide-angle X-ray diffraction (WAXD) studies further revealed sharp differences in the solid-state structures of the polypropene materials obtained from 1 and 3 under LCCTP according to the data presented in FIG. 6. As a frame of reference, isotactic polypropene obtained from 1 and 3 under non-LCCTP conditions predominantly adopts the a crystalline form with diffraction peaks occurring at 2θ=14.2°, 17.1°, 18.6°, and 21.1° for (110)$_α$, (040)$_α$, (130)$_α$, and (111)$_α$, respectively (see FIGS. 6a and 6e). However, when 10 equivalents of ZnEt$_2$ were employed for LCCTP using 1, the polypropene now displayed an α/γ disordered modification that is intermediate between α and γ forms with a characteristic diffraction peak at 2θ=20.1° for (117)γ (see FIG. 6c). On the other hand, under identical LCCTP conditions, dinuclear 3 provided crystalline polypropene of high isotacticity that largely maintains the α form (FIG. 6g). Finally, with 20 equivalents of ZnEt$_2$, mononuclear 1 yields amorphous polypropene that is characterized by the absence of crystalline diffraction peaks, while the polypropene obtained from dinuclear 3 is still crystalline, but also just beginning to exhibit evidence of structural disorder again in the solid state (see FIGS. 6d and 6h, respectively).

In conclusion, programmed manipulation of the more complex steric environment of dinuclear bis-propagators, comprising both regional and local effects, can be used as a tool for modulating the rate of a dynamic bimolecular process that is competitive with pseudo first-order chain growth. When coupled with the ability to directly control the concentration of active and surrogate species in LCCTP, the present results serve as an important extension of the one catalyst, many materials paradigm that a living 'two-state' coordination polymerization can provide.

Having now fully described this invention, it will be understood by those of ordinary skill in the art that the same can be performed within a wide and equivalent range of conditions, formulations and other parameters without affecting the scope of the invention or any embodiment thereof. All patents, patent applications, and publications cited herein are fully incorporated by reference herein in their entirety.

What is claimed is:

1. A method of producing a polyolefin composition comprising:
   (a) contacting a metallocene pre-catalyst and a co-catalyst, wherein the metallocene pre-catalyst has the formula:

A-Z—B  (I);

wherein A has the formula (II):

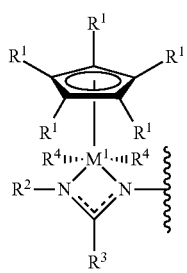

(II)

B has the formula (III):

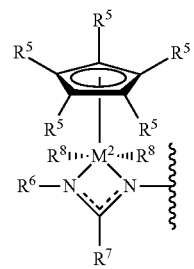

(III)

wherein the dotted lines in A and B indicate a delocalized bond;

M$^1$ and M$^2$ are each independently Ti, Zr, or Hf;

Z is a linker covalently linking A with B;

R$^1$ and R$^5$ are each independently hydrogen, alkyl, cycloalkyl, optionally substituted phenyl, or two adjacent R$^1$ or R$^5$ form an aromatic ring;

R$^2$, R$^3$, R$^6$, and R$^7$ are each independently alkyl, cycloalkyl, Si(alkyl)$_3$, Si(aryl)$_3$, phenyl, optionally substituted phenyl, or alkylphenyl; and R$^4$ and R$^8$ are each independently halogen, alkyl, cycloalkyl, aryl, or arylalkyl;

(b) adding a metal alkyl;

(c) adding a first olefin monomer; and (d) polymerizing by living coordinative chain transfer the first monomer for a time sufficient to form the polyolefin.

2. The method of claim 1, wherein M$^1$ and M$^2$ are the same and are Hf or Zr.

3. The method of claim 1, wherein R$^1$ and R$^5$ are the same and are selected from the group consisting of ethyl, methyl, iso-butyl, n-hexyl, n-propyl, and t-butyl.

4. The method of claim 1, wherein R$^4$ and R$^8$ are the same and are selected from the group consisting of ethyl, methyl, iso-butyl, n-hexyl, n-propyl, and t-butyl.

5. The method of claim 1, wherein R$^2$ and R$^6$ are the same and are selected from the group consisting of ethyl, methyl, iso-butyl, n-hexyl, n-propyl, and t-butyl.

6. The method of claim 1, wherein Z is —(CH$_2$)$_w$ and wherein w is 2-20.

7. The method of claim 1, wherein the metal alkyl is Zn(R$^{11}$)$_2$ and wherein R$^{11}$ is selected from the group consisting of ethyl, methyl, iso-butyl, n-hexyl, n-propyl, and t-butyl.

8. The method of claim 1, wherein the metal alkyl is ZnEt$_2$.

9. The method of claim 1, wherein the metallocene pre-catalyst and the co-catalyst are contacted at a temperature of about −20° C. to about 25° C.

10. The method of claim 1, wherein the metallocene pre-catalyst and the co-catalyst are contacted at a temperature of about −20° C. to about 0° C.

11. The method of claim 1, wherein the first olefin monomer is ethene, propene, 1-butene, 1-pentene, 1-hexene, 1-heptene, 1-octene, styrene, butadiene, isoprene, α-methyl styrene, acrylonitrile, methyl acrylate, methyl methacrylate, vinyl acetate, vinyl chloride, vinyl fluoride, vinylidene chloride, N-vinyl pyrrolidone, 3-methylbutene, 3-methyl-1-pentene, vinylcyclohexane, vinylcyclobutane, vinylcyclopentane, vinylcyclooctane, 1-decene, enantiomerically pure β-citronellene, 3,5,5-trimethyl-1-hexene, cyclopentene, vinylcyclohexene, or 4-methyl-1-pentene.

12. The method of claim 1, wherein the first olefin monomer is propene.

13. The method of claim 1, wherein the metallocene pre-catalyst is [($\eta^5$-C$_5$Me$_5$)Zr(Me)$_2$]$_2$[N(tBu)C(Me)N—(CH$_2$)$_4$—NC(Me)N(tBu)], [$\eta^5$-C$_5$Me$_5$)Zr(Me)$_2$]$_2$[N(tBu)C(Me)N—(CH$_2$)$_6$—NC(Me)N(tBu)], or [($\eta^5$-C$_5$Me$_5$)Zr(Me)$_2$]$_2$[N(tBu)C(Me)N—(CH$_2$)$_8$—NC(Me)N(tBu)].

14. The method of claim 1, wherein the co-catalyst is [PhNHMe$_2$][B(C$_6$F$_5$)$_4$].

15. The method of claim 1, wherein in the metallocene pre-catalyst and the co-catalyst are contacted in a metallocene pre-catalyst:co-catalyst molar ratio of about 1:2.

16. The method of claim 1, wherein the metallocene pre-catalyst and the metal alkyl are contacted in a metallocene pre-catalyst:metal alkyl molar ratio of about 1:100 to about 1:1.1.

17. The method of claim 1, wherein the metallocene pre-catalyst and the metal alkyl are contacted in a metallocene pre-catalyst:metal alkyl molar ratio of about 1:20 to about 1:1.1.

18. The method of claim 1, wherein the polyolefin is an isotactic stereoblock polyolefin.

19. The method of claim 1, wherein the polyolefin is isotactic stereoblock polypropene.

20. A method of producing a polyolefin composition comprising:
   (a) contacting a metallocene pre-catalyst selected from the group consisting of [($\eta^5$-C$_5$Me$_5$)Zr(Me)$_2$]$_2$[N(tBu)C(Me)N—(CH$_2$)$_4$—NC(Me)N(tBu)], [($\eta^5$-C$_5$Me$_5$)Zr(Me)$_2$]$_2$[N(tBu)C(Me)N—(CH$_2$)$_6$—NC(Me)N(tBu)], and [($\eta^5$-C$_5$Me$_5$)Zr(Me)$_2$]$_2$[N(tBu)C(Me)N—(CH$_2$)$_8$—NC(Me)N(tBu)] with the co-catalyst [PhNMe$_2$H][B(C$_6$F$_5$)$_3$Me] wherein the molar ratio of metallocene pre-catalyst to co-catalyst is about 1:2;
   (b) adding ZnEt$_2$;
   (c) adding a first olefin monomer; and
   (d) polymerizing by living coordinative chain transfer said first monomer for a time sufficient to form said polyolefin.

* * * * *